(12) United States Patent
Holme et al.

(10) Patent No.: US 12,378,164 B2
(45) Date of Patent: Aug. 5, 2025

(54) RAPID THERMAL PROCESSING METHODS AND APPARATUS

(71) Applicant: QUANTUMSCAPE BATTERY, INC., San Jose, CA (US)

(72) Inventors: Timothy Holme, Mountain View, CA (US); Martin Winterkorn, San Jose, CA (US); Dylan Tozier, San Jose, CA (US); Murugan Ramaswamy, San Jose, CA (US)

(73) Assignee: QUANTUMSCAPE BATTERY, INC., San Jose, CA (US)

( * ) Notice: Subject to any disclaimer, the term of this patent is extended or adjusted under 35 U.S.C. 154(b) by 0 days.

(21) Appl. No.: 18/473,177

(22) Filed: Sep. 22, 2023

(65) Prior Publication Data
US 2024/0361076 A1    Oct. 31, 2024

Related U.S. Application Data

(63) Continuation of application No. PCT/US2023/013048, filed on Feb. 14, 2023.
(Continued)

(51) Int. Cl.
*C04B 35/64* (2006.01)
*F27B 9/24* (2006.01)
(Continued)

(52) U.S. Cl.
CPC .............. *C04B 35/64* (2013.01); *F27B 9/24* (2013.01); *F27B 9/40* (2013.01);
(Continued)

(58) Field of Classification Search
CPC . C04B 35/486; C04B 35/6263; C04B 35/632; C04B 35/6342; C04B 35/63424;
(Continued)

(56) References Cited

U.S. PATENT DOCUMENTS

| 2,900,254 A | 8/1959 | Raiklen |
| 3,330,654 A | 7/1967 | Sweet |

(Continued)

FOREIGN PATENT DOCUMENTS

| CN | 102554249 A | 7/2012 |
| CN | 110 869 456 A | 3/2020 |

(Continued)

OTHER PUBLICATIONS

International search report and written opinion of PCT/US2024/015067 dated Jul. 12, 2024; 13 pages.
(Continued)

*Primary Examiner* — Steven B McAllister
*Assistant Examiner* — Benjamin W Johnson
(74) *Attorney, Agent, or Firm* — Squire Patton Boggs (US) LLP

(57) ABSTRACT

Methods and apparatus for fabricating separators for solid-state lithium metal batteries employ rapid thermal processing. Aspects include high temperature sintering. Temperatures, durations of heat application, and proximity of heating elements to materials undergoing sintering combine to provide separators with desirable physical characteristics, including porosity, in a batch process.

20 Claims, 21 Drawing Sheets

US 12,378,164 B2

Page 2

Related U.S. Application Data

(60) Provisional application No. 63/314,296, filed on Feb. 25, 2022, provisional application No. 63/309,985, filed on Feb. 14, 2022.

(51) Int. Cl.
*F27B 9/40* (2006.01)
*H01M 10/0562* (2010.01)
*H01M 50/403* (2021.01)
*H01M 50/431* (2021.01)
*C04B 35/486* (2006.01)
*C04B 35/626* (2006.01)
*C04B 35/632* (2006.01)
*C04B 35/634* (2006.01)
*C04B 35/638* (2006.01)
*F27B 9/36* (2006.01)
*F27D 19/00* (2006.01)
*F27D 21/00* (2006.01)

(52) U.S. Cl.
CPC ..... *H01M 10/0562* (2013.01); *H01M 50/403* (2021.01); *H01M 50/431* (2021.01); *C04B 35/486* (2013.01); *C04B 35/6263* (2013.01); *C04B 35/632* (2013.01); *C04B 35/6342* (2013.01); *C04B 35/63424* (2013.01); *C04B 35/638* (2013.01); *C04B 2235/3203* (2013.01); *C04B 2235/3227* (2013.01); *C04B 2235/6562* (2013.01); *C04B 2235/6565* (2013.01); *C04B 2235/6567* (2013.01); *C04B 2235/6586* (2013.01); *C04B 2235/666* (2013.01); *C04B 2235/764* (2013.01); *C04B 2235/9623* (2013.01); *F27B 2009/3607* (2013.01); *F27D 19/00* (2013.01); *F27D 21/00* (2013.01); *H01M 2300/0068* (2013.01); *H01M 2300/0071* (2013.01); *Y02E 60/10* (2013.01)

(58) Field of Classification Search
CPC .......... C04B 35/638; C04B 35/64; C04B 2235/3203; C04B 2235/3227; C04B 2235/6562; C04B 2235/6565; C04B 2235/6567; C04B 2235/6586; C04B 2235/666; C04B 2235/764; C04B 2235/9623; F27B 9/24; F27B 9/40; F27B 2009/3607; F27D 19/00; F27D 21/00; H01M 10/0562; H01M 50/403; H01M 50/431; H01M 2300/0068; H01M 2300/0071; Y02E 60/10
USPC .......................................................... 432/11
See application file for complete search history.

(56) References Cited

U.S. PATENT DOCUMENTS

| | | | |
|---|---|---|---|
| 3,704,872 A | 12/1972 | Klein | |
| 5,089,455 A | 2/1992 | Ketcham et al. | |
| 5,567,240 A | 10/1996 | Kogame et al. | |
| 5,686,394 A | 11/1997 | Sibata et al. | |
| 8,696,350 B2 | 4/2014 | Ohara | |
| 9,631,867 B2 | 4/2017 | Borrel | |
| 10,026,990 B2 | 7/2018 | Badding et al. | |
| 10,155,667 B2 | 12/2018 | Badding et al. | |
| 10,396,396 B2 | 8/2019 | Badding et al. | |
| 10,486,332 B2 | 11/2019 | Badding et al. | |
| 10,563,918 B2 | 2/2020 | Iyer et al. | |
| 10,581,115 B2 | 3/2020 | Badding et al. | |
| 10,766,165 B2 | 9/2020 | Badding et al. | |
| 10,840,544 B2 | 11/2020 | Holme et al. | |
| 10,875,212 B2 | 12/2020 | Badding et al. | |
| 10,967,539 B2 | 4/2021 | Badding et al. | |
| 11,014,822 B2 | 5/2021 | Badding et al. | |
| 11,111,155 B1 | 9/2021 | Badding et al. | |
| 11,148,321 B2 | 10/2021 | Badding et al. | |
| 11,351,697 B2 | 6/2022 | Badding et al. | |
| 11,411,245 B2 | 8/2022 | Badding et al. | |
| 11,629,915 B2 | 4/2023 | Badding et al. | |
| 11,735,707 B2 | 8/2023 | Jamadar et al. | |
| 11,768,032 B2 | 9/2023 | Badding et al. | |
| 11,953,264 B2 | 4/2024 | Badding et al. | |
| 2004/0206470 A1 | 10/2004 | Bayazitoglu | |
| 2014/0134438 A1 | 5/2014 | Gadkaree et al. | |
| 2015/0099188 A1 | 4/2015 | Holme et al. | |
| 2017/0210634 A1 | 7/2017 | Badding et al. | |
| 2018/0104848 A1 | 4/2018 | Badding et al. | |
| 2019/0077674 A1 | 3/2019 | Badding et al. | |
| 2019/0103630 A1* | 4/2019 | Choi | C04B 35/645 |
| 2019/0207252 A1 | 7/2019 | Badding | |
| 2019/0280331 A1* | 9/2019 | Holme | C04B 35/486 |
| 2020/0112050 A1* | 4/2020 | Hu | H01M 10/0525 |
| 2020/0144660 A1 | 5/2020 | Schneider et al. | |
| 2021/0143389 A1 | 5/2021 | Sceats et al. | |
| 2021/0344040 A1 | 11/2021 | Donnelly et al. | |
| 2022/0085425 A1 | 3/2022 | Jamadar et al. | |
| 2022/0166062 A1 | 5/2022 | Kim et al. | |
| 2022/0209288 A1 | 6/2022 | Badding et al. | |
| 2022/0209289 A1 | 6/2022 | Badding et al. | |
| 2022/0278364 A1 | 9/2022 | Badding et al. | |
| 2023/0307701 A1 | 9/2023 | Badding et al. | |

FOREIGN PATENT DOCUMENTS

| | | | |
|---|---|---|---|
| EP | 0 596 822 A1 | 5/1994 | |
| EP | 2 037 527 A1 | 3/2009 | |
| EP | 3511137 A1 | 7/2019 | |
| EP | 3 408 246 B1 | 2/2020 | |
| JP | 2001-031476 A | 2/2001 | |
| JP | 2003-328006 A | 11/2003 | |
| JP | 2009-203898 | 9/2009 | |
| JP | 2010-176941 A | 8/2010 | |
| WO | WO 2005/085138 A1 | 9/2005 | |
| WO | WO 2010/051345 A2 | 5/2010 | |
| WO | WO 2014/036090 | 3/2014 | |
| WO | WO 2014/103662 A1 | 7/2014 | |
| WO | WO 2017/003980 A1 | 1/2017 | |
| WO | WO 2018/118964 A1 | 6/2018 | |
| WO | WO 2018/236394 A1 | 12/2018 | |
| WO | WO 2020/174961 A1 | 9/2020 | |
| WO | WO 2020/236767 A1 | 11/2020 | |
| WO | WO 2022/050258 A1 | 3/2022 | |
| WO | WO 2022/192464 A1 | 9/2022 | |

OTHER PUBLICATIONS

International search report and written opinion of PCT/US2022/019641 dated Jul. 7, 2022; 14 pages.
International search report and written opinion of PCT/US2023/013048 dated Apr. 6, 2023; 18 pages.
Geng, et al., "Effect of sintering atmosphere on ionic conduction and structure of $Li_{0.5}La_{0.5}TiO_3$ solid electrolytes", Materials Science and Engineering B, vol. 164, 2009, pp. 91-95, ISSN 0921-5107, https://doi.org/10.1016/j.mseb.2009.07.011.
Geng, H., et al., "Effect of sintering temperature on microstructure and transport properties of $Li_{3x}La_{2/3-x}TiO_3$ with different lithium contents", Electrochimica Acta, vol. 56, issue 9, 2011, pp. 3406-3414, ISSN 0013-4686, https://doi.org/10.1016/j.electacta.2010.06.031.
Hu eat al. "Highly conductive paper for energy-storage devices", PNAS, vol. 106, No. 51, Dec. 22, 2009, pp. 21490-21494; www.pnas.org/cgi/doi/10.1073/pnas.0908858106.
Lu et al., "Electrochemical performance of $LiCoO_2$ cathodes by surface modification using lanthanum aluminum garnet", Journal of Power Sources 184 (2008) 392-401; doi: 10.1016/j.jpowsour.2008.04.087.
TA Instruments: "DILATOMETRY", Dec. 30, 2013, pp. 1-32, XP093035804; Retrieved from the Internet: URL:https://tainstruments.com.cn/wp-content/uploads/DIL_805.pdf [retrieved on Mar 29, 2023].

(56) References Cited

OTHER PUBLICATIONS

Waetzig, et al., "Synthesis and sintering of $Li_{1.3}Al_{0.3}Ti_{1.7}(PO_4)_3$ (LATP) electrolyte for ceramics with improved Li+ conductivity", Journal of Alloys and Compounds, vol. 818, 2020, 153237, ISSN 0925-8388, https://doi.org/10.1016/j.jallcom.2019.153237.
Wang et al., "A general method to synthesize and sinter bulk ceramics in seconds", Science 368, May 1, 2020, pp. 521-526.
Yan, G. et al., "Influence of sintering temperature on conductivity and mechanical behavior of the solid electrolyte LATP", Ceramics International, vol. 45, Issue 12, 2019, pp. 14697-14703, ISSN 0272-8842, https://doi.org/10.1016/j.ceramint.2019.04.191.
Interanational search report and written opinion of PCT/US2023/074226 mailed Feb. 7, 2024; 11 pages.

* cited by examiner

RAPID THERMAL PROCESSING METHODS AND APPARATUS

CROSS-REFERENCE TO RELATED APPLICATIONS

This application is a continuation of International PCT Patent Application No. PCT/US2023/013048, filed Feb. 14, 2023, which claims priority to, and the benefit of, U.S. Provisional Patent Application No. 63/309,985, filed Feb. 14, 2022, and titled RAPID THERMAL PROCESSING METHODS AND APPARATUS, and U.S. Provisional Patent Application No. 63/314,296, filed Feb. 25, 2022, and titled RAPID THERMAL PROCESSING METHODS AND APPARATUS. All these applications are incorporated herein by reference in their entirety for all purposes.

This application also is related to International PCT Patent Application No. PCT/US2022/019641, filed Mar. 9, 2022, and titled RAPID CERAMIC PROCESSING TECHNIQUES AND EQUIPMENT, and to U.S. patent application Ser. No. 17/905,822, filed Sep. 8, 2022, and titled RAPID CERAMIC PROCESSING TECHNIQUES AND EQUIPMENT. Both of these applications also are incorporated herein by reference in their entirety for all purposes.

FIELD

The present application relates to rechargeable batteries, particularly solid-state lithium metal batteries, and more particularly to rapid thermal processing methods and apparatus to fabricate solid-state electrolytes in a batch process for lithium metal batteries such as, but not limited to, lithium lanthanum titanate, lithium aluminum titanium phosphate (LATP), lithium aluminum germanium phosphate (LAGP), or lithium-stuffed garnet oxides. In some examples, these ceramics are deposited as a layer on top of a metal layer. These two layers make a bilayer.

BACKGROUND

Solid-state lithium metal batteries include an anode, a cathode, and a solid-state electrolyte separator. The solid-state electrolyte separator should conduct lithium ions between the anode and the cathode. It would be desirable to have separators which have these characteristics, and which can be fabricated efficiently.

Certain methods of sintering lithium-stuffed garnet (crystalline lithium lanthanum zirconium oxide, or herein "LLZO"), such as batch sintering of LLZO, have been described, in, for example, U.S. Pat. No. 10,563,918 B2 or U.S. Pat. No. 10,840,544 B2. High-throughput continuous sintering of certain ceramics is disclosed in U.S. Pat. No. 10,766,165 B2; and also International PCT Patent Application Publication No. WO 2017/003980 A1.

SUMMARY

Aspects of the following description set forth methods and apparatus employing rapid thermal processing (RTP) to fabricate separators in solid-state lithium metal batteries. In some aspects, the methods involve sintering material at high temperatures for short periods of time to produce the separators in a batch process. Depending on the embodiment, the temperatures may range from about 900° C. to about 2000° C. Depending on the embodiment, the time periods may range from about 5 seconds to about 30 minutes. Depending on the embodiment, the heating elements may be from about 1 millimeter to about 2000 millimeters from the material being sintered. Depending on the embodiment, the heating elements may be as close to the material being sintered as the respective surfaces of the heating elements and of the material being sintered will permit without contact between one or both of the heating elements and the material being sintered. Depending on the embodiment, the sintered material may comprise LATP, LAGP, or LLZO. In some aspects, the apparatus includes one or more heating elements in sufficient proximity to the material being sintered. Depending on the embodiment, the heating elements may comprise different forms of silicon carbide, molybdenum or carbon.

Some embodiments are directed to a sintered article prepared according to one of the methods disclosed herein. Other embodiments are directed to a rechargeable battery prepared according to one of the methods disclosed herein.

DETAILED DESCRIPTION

Figure 1:
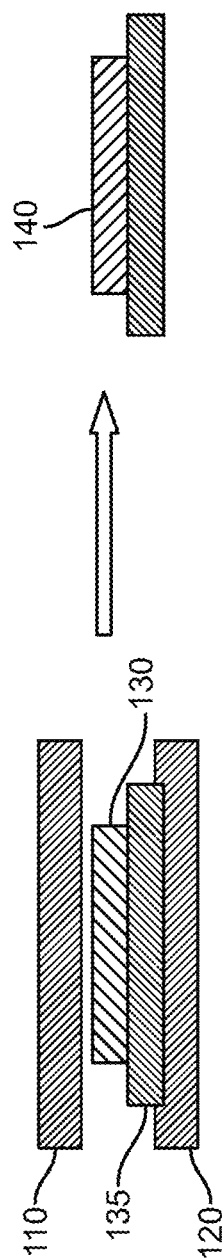
FIG. 1 is a high level view of an apparatus according to an embodiment.

The following description enables ordinarily skilled artisans to make and use the disclosed subject matter and to incorporate that subject matter in a number of applications. Various modifications, as well as a variety of uses in different applications, will be readily apparent to ordinarily skilled artisans. The general principles described herein may be applied to a wide range of embodiments. Thus, the present disclosure is not intended to be limited to the embodiments presented, but is to be accorded the widest scope consistent with the principles and novel features disclosed herein.

In the following detailed description, numerous specific details are set forth in order to provide a more thorough understanding of the disclosed structures and techniques. However, it will be apparent to ordinarily skilled artisans that they can practice these disclosed structures and techniques without necessarily being limited to these specific details. In other instances, well-known structures and devices are shown in block diagram form, rather than in detail, in order to avoid obscuring the present disclosure.

Definitions

As used herein, the term "about," when qualifying a number, e.g., about 15 weight percent (% w/w), refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well as 67° C., 68° C., 69° C., 70° C., 71° C., 72° C., 73° C., 74° C., 75° C., 76° C., 77° C., 78° C., 79° C., 80° C., 81° C., 82° C., or 83° C.

As used herein, "selected from the group consisting of" refers to a single member from the group, more than one member from the group, or a combination of members from the group. For example, a member selected from the group consisting of A, B, and C can include A only, B only, or C only, as well as A and B, A and C, B and C, as well as A, B, and C.

As used herein, the phrases "electrochemical cell" or "battery cell" shall, unless specified to the contrary, mean a single cell including a positive electrode and a negative electrode, which have ionic communication between the two by way of an electrolyte. In some embodiments, a battery or module includes multiple positive electrodes and/or multiple negative electrodes enclosed in one container, e.g., a stack of electrochemical cells. A stack of electrochemical cells may be referred to as a multi-layered cell. A symmetric cell may be a cell having two Li metal anodes separated by a solid-state electrolyte.

As used herein, the phrase "electrochemical stack" refers to one or more units, each of which includes at least a negative electrode (e.g., Li, $LiC_6$), a positive electrode (e.g., $FeF_3$, $NiF_x$ wherein x is 2 or 3, nickel-cobalt aluminum oxide (NCA), lithium iron phosphate (LFP), $LiNi_xMn_yCo_zO_2$, [NMC] or $LiNi_xAl_yCo_zO_2$ [NCA], wherein x+y+z=1; and wherein 0≤x≤1; 0≤y≤1; and 0≤z≤1, optionally combined with a solid-state electrolyte or a gel electrolyte), and a solid-state electrolyte (e.g., an oxide electrolyte set forth herein such as a lithium-stuffed garnet (e.g., $Li_7La_3Zr_2O_{12}$)) between and in contact with the positive and negative electrodes. In some examples, between the solid-state electrolyte and the positive electrode, there is an additional layer comprising a compliant electrolyte (e.g., gel electrolyte, gel polymer electrolyte). An electrochemical stack may include one of these aforementioned units. An electrochemical stack may include several of these aforementioned units arranged in electrical communication (e.g., serial or parallel electrical connection). In some examples, when the electrochemical stack includes several units, the units are layered or laminated together in a column. In some examples, when the electrochemical stack includes several units, the units are layered or laminated together in an array.

In some examples, when the electrochemical stack includes several units, the stacks are arranged such that one negative electrode current collector is shared with two or more positive electrodes. Alternatively, in some examples, when the electrochemical stack includes several units, the stacks are arranged such that one positive electrode current collector is shared with two or more negative electrodes. Unless specified otherwise, an electrochemical stack includes one positive electrode current collector, one solid-state electrolyte, and one negative electrode, and optionally includes a bonding layer between the positive electrode and the solid electrolyte.

As used herein, the phrase "positive electrode" refers to the electrode in a secondary battery towards which positive ions, e.g., $Li^+$, conduct, flow, or move during discharge of the battery. As used herein, the phrase "negative electrode" refers to the electrode in a secondary battery from which positive ions, e.g., $Li^+$ flow, or move during discharge of the battery. In a battery comprised of a Li-metal electrode and a conversion chemistry, intercalation chemistry, or combination of conversion/intercalation chemistry-including electrode (i.e., cathode active material), the electrode having the conversion chemistry, intercalation chemistry, or combination of conversion/intercalation chemistry material is referred to as the positive electrode. In some usage, cathode is used in place of positive electrode, and anode is used in place of negative electrode. When a Li-secondary battery is charged, Li ions move from the positive electrode (e.g., $NiF_x$, NMC, NCA) towards the negative electrode (e.g., Li-metal). When a Li-secondary battery is discharged, Li ions move towards the positive electrode and from the negative electrode.

As used herein, the phrase "positive electrode terminal" refers to an electrical connection to the positive electrode. A positive electrode terminal may also be referred to as a positive electrode current collector.

As used herein, the phrase "negative electrode terminal" refers to an electrical connection to the negative electrode. A negative electrode terminal may also be referred to as a negative electrode current collector.

As used herein, the phrase "cathode active material" refers to a material which can intercalate lithium ions or react with lithium ions in a reversible manner. Examples include $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, x+y+z=1, 0≤x≤1, 0≤y≤1, and 0≤z≤1; and $LiNi_xCo_yAl_zO_2$, wherein x+y+z=1, and 0≤x≤1, 0≤y≤1, and 0≤z≤1. In these formula, x, y, and z are chosen so that the formula is charge neutral.

As used herein, the phrase "solid-state cathode" refers to a cathode that does not include a liquid-phase electrolyte. As used herein, the terms "cathode" and "anode" refer to the electrodes of a battery. The cathode and anode are often referred to in the relevant field as the positive electrode and negative electrode, respectively.

As used herein, the phrase "solid-state catholyte" or the term "catholyte" refers to an ion conductor that is intimately mixed with, or surrounded by, a cathode (i.e., positive electrode) active material.

As used herein, the term "electrolyte" refers to a material that allows ions, e.g., Li+, to migrate therethrough, but which does not allow electrons to conduct therethrough. For example, the ratio of ionic to electronic conductivity is at least a factor of $10^6$. Electrolytes are useful for electrically insulating the cathode and anode of a secondary battery while allowing ions, e.g., Li+, to transmit through the electrolyte.

As used here, the phrase "solid-state electrolyte separator" is used interchangeably with the phrase "solid separator," and refers to a material which conducts atomic ions (e.g., Li$^+$) but does not conduct electrons. A solid-state electrolyte separator is a solid material suitable for electrically isolating the positive and negative electrodes of a lithium secondary battery while also providing a conduction pathway for lithium ions. Examples of inorganic solid-state electrolytes include oxide electrolytes and sulfide electrolytes, which are further defined below. Non-limiting examples of sulfide electrolytes are found, for example, in U.S. Pat. No. 9,172,114, which issued Oct. 27, 2015, and also in U.S. Patent Application Publication No. 2017-0162901 A1, which published Jun. 8, 2017. Non-limiting example oxide electrolytes are found, for example, in U.S. Patent Application Publication No. 2015-0200420 A1, which published Jul. 16, 2015, and issued as U.S. Pat. No. 9,806,372 on Oct. 31, 2017. In some examples, the inorganic solid-state electrolyte also includes a polymer and is referred to as a composite electrolyte. Composite electrolytes are found for example in U.S. Pat. No. 9,666,870. The entire contents of the just-mentioned U.S. patents and published U.S. patent applications are incorporated herein by reference in their entirety for all purposes.

As used herein the phrase "annealing," refers to heating a material, e.g., from 100° C. to 1400° C., or e.g., 100° C., 150° C., 200° C., 250° C., 300° C., 350° C., 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., or 1450° C. in a reducing atmosphere, e.g., dry air or argon, Ar/H$_2$, and N$_2$. Some example annealing methods are found in U.S. Pat. No. 9,966,630 B2, which is incorporated by reference herein in its entirety for all purposes.

In some examples, the films are heated in the apparatus described herein, or in a process described herein. In some examples the film is heated to 1000° C. In some examples the film is heated to 1010° C. In some examples the film is heated to 1020° C. In some examples the film is heated to 1030° C. In some examples the film is heated to 1040° C. In some examples the film is heated to 1050° C. In some examples the film is heated to 1060° C. In some examples the film is heated to 1070° C. In some examples the film is heated to 1080° C. In some examples the film is heated to 1090° C. In some examples the film is heated to 1100° C. In some examples the film is heated to 1110° C. In some examples the film is heated to 1120° C. In some examples the film is heated to 1130° C. In some examples the film is heated to 1140° C. In some examples the film is heated to 1150° C. In some examples the film is heated to 1160° C. In some examples the film is heated to 1170° C. In some examples the film is heated to 1180° C. In some examples the film is heated to 1190° C. In some examples the film is heated to 1200° C. In some examples the film is heated to 1210° C. In some examples the film is heated to 1220° C. In some examples the film is heated to 1230° C. In some examples the film is heated to 1240° C. In some examples the film is heated to 1250° C.

As used herein, the terms "separator" and "Li$^+$ ion-conducting separator" are used interchangeably, with separator being a short-hand reference for Li$^+$ ion-conducting separator, unless explicitly specified otherwise.

Unless explicitly specified to the contrary, a separator as used herein is stable when in contact with lithium metal. Stability in contact with lithium metal can be demonstrated by the absence of significant exothermic reactions when lithium metal and the separator material are in intimate contact and heated to at least 200° C. in a differential scanning calorimeter. In an embodiment, stability may be kinetic stability to build up a solid electrolyte interface (SEI) which increases ASR by more than about 100. In an embodiment, stability may be kinetic stability to build up a SEI which increases ASR by more than about 1000. In different embodiments, stability may be kinetic stability to build up a SEI which increases ASR in a range between about 100 and about 1000. In an embodiment, stability may be defined in terms of initial ASR when contacted with lithium, and change in ASR after prolonged contact with lithium. In an embodiment, prolonged contact may be exposure of about 30 days to lithium at a temperature of about 60° C.

As used herein, the phrase "thickness" or "film thickness" refers to the distance, or median measured distance between the top and bottom faces or surfaces. As used herein, the top and bottom faces or surfaces refer to the sides having the largest geometric surface area.

As used herein, "thin" means, when qualifying a solid-state electrolyte, a thickness dimension less than 200 µm, sometimes less than 100 µm and in some cases between 0.1 and 60 µm, and in other cases from about 10 nm to about 100 µm; in other cases about 1 µm, 10 µm, or 50 µm in thickness.

As used herein, the phrase "lithium stuffed garnet" refers to oxides that are characterized by a crystal structure related to a garnet crystal structure. U.S. Patent Application Publication No. U.S. 2015/0099190, which published Apr. 9, 2015 and was filed Oct. 7, 2014 as Ser. No. 14/509,029, is incorporated by reference herein in its entirety for all purposes. This application describes Li-stuffed garnet solid-state electrolytes used in solid-state lithium rechargeable batteries.

Unless stated otherwise to the contrary, lithium-stuffed garnets include compounds having the formula $Li_4La_BM'_CM''_DZr_EO_F$, $Li_4La_BM'_CM''_DTa_EO_F$, or $Li_4La_BM'_CM''_DNb_EO_F$, wherein $4<A<8.5$, $1.5<B<4$, $0\le C\le 2$, $0\le D\le 2$; $0\le E\le 2.5$, $10<F<13$, and M" and M" are each, independently in each instance selected from Al, Mo, W, Ga, Nb, Sb, Ca, Ba, Sr, Ce, Hf, Rb, or Ta, or $Li_aLa_bZr_cAl_d\text{-}Me''_eO_f$, wherein $5<a<7.7$; $2<b<4$; $0\le c\le 2.5$; $0\le d\le 2$; $0\le e\le 2$, $10<f<13$ and Me" is a metal selected from Nb, Ta, V, W, Mo, Ga, or Sb and as described herein.

Li-stuffed garnets may also be a composition according to $Li_4La_BM'_CM''_DZr_EO_F$, $Li_4La_BM'_CM''_DTa_EO_F$, Or $Li_4La_BM'_CM''_DNb_EO_F$, wherein $4<A<8.5$, $1.5<B<4$, $0\le C\le 2$, $0\le D\le 2$; $0\le E\le 3$, $10<F<13$, and M' and M" are each, independently in each instance selected from Ga, Al, Mo, W, Nb, Sb, Ca, Ba, Sr, Ce, Hf, Rb, or Ta, or $Li_aLa_bZr_cAl_dMe''_eO_f$, wherein $5<a<8.5$; $2<b<4$; $0<c\le 2.5$; $0\le d<2$; $0\le e<2$, and $10<f<13$ and Me" is a metal selected from Ga, Nb, Ta, V, W, Mo, or Sb and as otherwise described in U.S. Patent Application Publication No. U.S. 2015/0099190. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (t1+t2+t3=2) so that the La:(Zr/Nb/Ta) ratio is 3:2. Also, garnets used herein include, but are not limited to, $Li_xLa_3Zr_2O_F+yAl_2O_3$, wherein x ranges from 5.5 to 9; and y ranges from 0.05 to 1. In these examples, subscripts x, y, and F are selected so that the garnet is charge neutral. In some examples x is 7 and y is 1.0. In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and y is 0.22. In some examples, x is 8 and y is 0.22. In some examples, x is 9 and y is 0.22. Also, garnets as used herein include, but are not limited to, $Li_xLa_3Zr_2O_{12+y}\cdot Al_2O_3$. In one embodiment, the Li-stuffed garnet herein has a composition of $Li_7Li_3Zr_2O_{12}$. In another embodiment, the Li-stuffed garnet herein has a composition of $Li_7Li_3Zr_2O_{12}\cdot Al_2O_3$. In yet another embodiment, the Li-stuffed garnet herein has a composition of $Li_7Li_3Zr_2O_{12}\cdot 0.22Al_2O_3$. In yet another embodiment, the Li-stuffed garnet herein has a composition of $Li_7Li_3Zr_2O_{12}\cdot 0.35Al_2O_3$. In certain other embodiments, the Li-stuffed garnet herein has a composition of $Li_7Li_3Zr_2O_{12}\cdot 0.5Al_2O_3$. In another embodiment, the Li-stuffed garnet herein has a composition of $Li_7Li_3Zr_2O_{12}\cdot 0.75Al_2O_3$.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrase "green film" or "green tape" refers to an unsintered tape or film that includes lithium-stuffed garnet, precursors to lithium-stuffed garnet, or a combination thereof and at least one of a binder, plasticizer, carbon, dispersant, solvent, or combinations thereof. As used herein, "green film tape" refers to a roll, continuous layer, or cut portion thereof of casted tape, either dry or not dry, of green film. A green body is used interchangeably with green film or green tape. A green tape may also include the patches of green bodies which are deposited on a metal layer (i.e., patch coating of a metal layer).

As used herein, "atmospheric control," refers to a system that controls the moisture content, oxygen content, gas flow rate, gas temperature, gas content(s), gas concentration(s), total pressure, vacuum, and combinations thereof within an enclosed or confined space. Atmospheric control can be dynamic in the sense that the system responds to sensed conditions and modifies the atmosphere so as to modify the atmosphere to more closely adhered to certain predetermined conditions. Atmosphere in this instance refers to the gaseous environment immediately in contact with a green tape that is being heated, calcined, sintered, or cooled; or the gaseous environment immediately in contact with a sintered tape that is being heated, sintered, annealed, or cooled. In some examples described herein, atmospheric control includes controlling the flow rate of an inlet gas comprising any of oxygen, argon, nitrogen, helium and/or hydrogen. In some examples, described herein, atmospheric control includes controlling the amount of water, oxygen, and lithium which is present in the gas state and in immediate contact with a green tape that is being heated, calcined, sintered, or cooled; or in immediate contact with a sintered tape that is being heated, sintered, annealed, or cooled. Atmospheric control may use various gas curtains, gas densities, gas flow rates, gas flow directions, or pulses of gases in, around, and near ovens, furnaces, and any inlets or outlets as well as any apertures through which material such as a green tape or sintered article may pass into or out of an oven or furnace. Atmospheric control may refer to a system wherein nitrogen gas, argon gas, forming gas, dry air, or humidified air is used within an enclosed or confined space. Atmospheric control may refer to a system wherein partial vacuum may be applied to the system, such as when the pressure is less than atmospheric pressure.

As used herein, a "sintered bilayer" refers to a two-layer structure comprising a sintered solid-state electrolyte and a metal foil. As used herein, a "green bilayer" refers to a two-layer structure comprising a green film and a metal foil.

As used herein, a "gas curtain" refers to gas flow rates at certain entrances or exits (e.g., green tape inlets and sintered film outlets) of an oven wherein the gas flow rate is determined. For example, the gas flow rate may be between 1-50 Liters/minute at standard pressure and temperature. For example, the gas flow rate may be between greater than 50 Liters/minute at standard pressure and temperature. Gas curtains may have pressure sensors at an outlet. The gas curtain flows across the entrance or exit of an oven to control the flow of gas within the oven. A gas curtain may help to maintain a certain atmosphere inside the oven by preventing, partially or completely, gas from exiting or entering the oven.

As used herein the phrase "dry air," refers to air with a reduced amount of humidity. Dry air may be supplied in a clean room. Dry air is characterized as having a dew point less than $-20°$ C., less than $-30°$ C., less than $-40°$ C., less than $-50°$ C., less than $-60°$ C., or less than $-70°$ C.

FIG. 1 shows a high level overview of an RTP apparatus and accompanying method according to an embodiment. Heating elements 110 and 120 apply heat at a desired temperature, for a desired period of time, to material 130 placed between the elements to produce sintered element 140 which functions as a separator between anode and cathode elements in a solid-state battery. The heating elements 110 and 120 are positioned so that they are a desired distance from material 130. In an embodiment, material 130 rests on heating element 120. In an embodiment, material 130 rests on setter 135 which in turn rests on heating element 120. In an embodiment, one of heating elements 110 and 120 may be omitted.

As used herein, area-specific resistance (ASR) is measured by electrochemical cycling using an Arbin or Biologic instrument unless otherwise specified to the contrary.

As used herein, ionic conductivity is measured by electrical impedance spectroscopy methods.

As used herein, the phrase "ambient conditions," refers to room temperature and a natural atmosphere such as the atmosphere of planet Earth that includes approximately 78%

N₂ & 21% O₂; and/or with moisture also present. Ambient conditions include standard temperature and pressure, with a relative humidity of at least 1%.

As used herein, "binder" refers to a polymer with the capability to increase the adhesion and/or cohesion of material, such as the solids in a green tape. Suitable binders may include, but are not limited to, PVDF, PVDF-HFP, SBR, and ethylene alpha-olefin copolymer. A "binder" refers to a material that assists in the adhesion of another material. For example, as used herein, polyvinyl butyral is a binder because it is useful for adhering garnet materials. Other binders may include polycarbonates. Other binders may include poly acrylates and poly methacrylates. These examples of binders are not limiting as to the entire scope of binders contemplated here but merely serve as examples. Binders useful in the present disclosure include, but are not limited to, polypropylene (PP), polyethylene, atactic polypropylene (aPP), isotactic polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), polyethylene-co-poly(methylene cyclopentane) (PE-co-PMCP), poly(methyl methacrylate) (and other acrylics), acrylic, polyvinylacetacetal resin, polyvinyl butyral resin, PVB, polyvinyl acetal resin, stereoblock polypropylenes, polypropylene polymethylpentene copolymer, polyethylene oxide (PEO), PEO block copolymers, silicone, and the like. In some examples, including any of the foregoing, the binder is a polymer is selected from the group consisting of polyacrylonitrile (PAN), polypropylene, polyethylene, polyethylene oxide (PEO), poly methyl methacrylate (PMMA), polyvinyl chloride (PVC), polyvinyl pyrrolidone (PVP), polyethylene oxide poly(allyl glycidyl ether) PEO-AGE, polyethylene oxide 2-methoxy ethoxy ethyl glycidyl ether (PEO-MEEGE), polyethylene oxide 2-methoxyethoxyethyl glycidyl poly(allyl glycidyl ether) (PEO-MEEGE-AGE), polysiloxane, polyvinylidene fluoride (PVDF), polyvinylidene fluoride hexafluoropropylene (PVDF-HFP), ethylene propylene (EPR), nitrile rubber (NPR), styrene-butadiene-rubber (SBR), polybutadiene polymer, polybutadiene rubber (PB), polyisobutadiene rubber (PIB), polyolefin, alpha-polyolefin, ethylene alpha-polyolefin, polyisoprene rubber (PI), polychloroprene rubber (CR), acrylonitrile-butadiene rubber (NBR), and polyethyl acrylate (PEA).

As used herein the phrase "casting a film" refers to the process of delivering or transferring a liquid or a slurry into a mold, or onto a substrate, such that the liquid or the slurry forms, or is formed into, a film. Casting may be done via doctor blade, meyer rod, comma coater, gravure coater, microgravure, reverse comma coater, slot die, slip and/or tape casting, and other methods.

Figure 2:
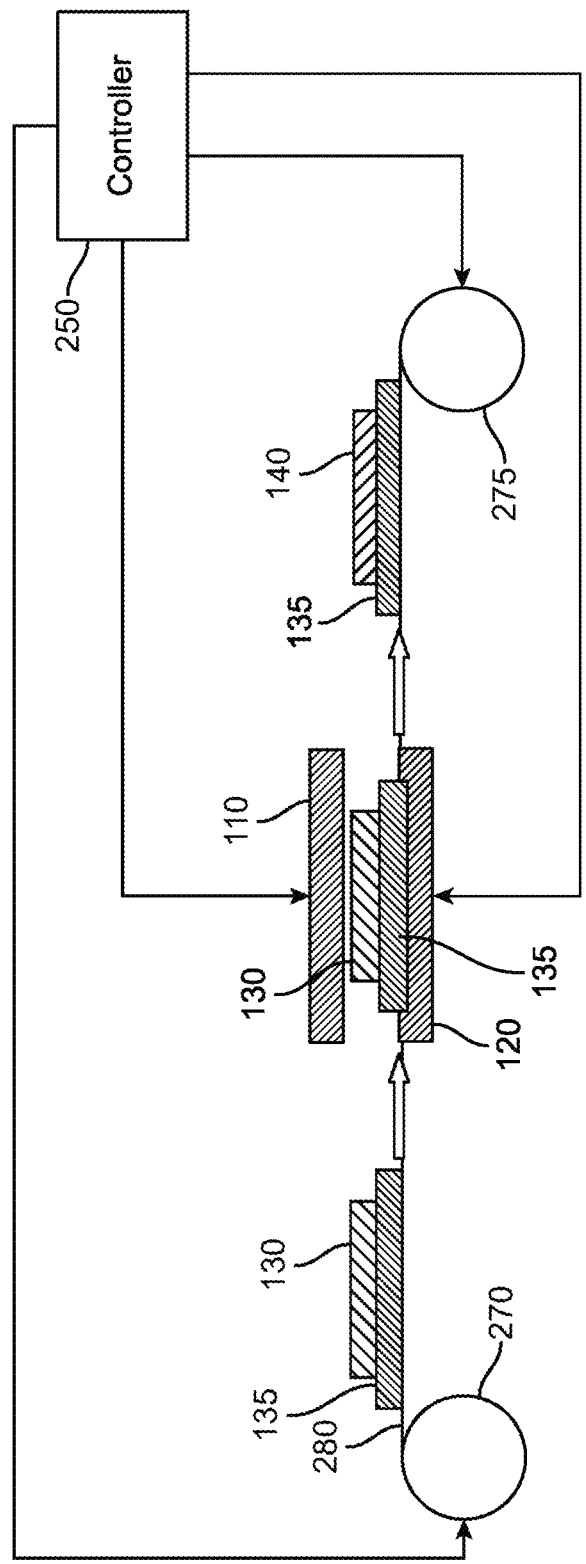
FIG. 2 is a high level view of an apparatus according to an embodiment.

FIG. 2 shows a high level overview of an RTP apparatus and accompanying method according to an embodiment. As in FIG. 1, heating elements 110 and 120 apply heat to material 130 placed between the elements to produce sintered element 140. A controller 250 controls the heating elements 110 and 120 to heat the material 130 to a desired temperature. In some examples, the controller controls the temperature of the furnace so that the furnace ramps up to a temperature within a desired temperature range at a rate of up to 300° C. per minute.

Controller 250 also controls a conveyor comprising rollers 270 and 275 and conveyor belt 280 to transport the material 130, placed on conveyor belt 280, between the heating elements 110 and 120. Controller 250 further controls the conveyor so that the material 130 remains between the heating elements 110 and 120 for a desired period of time. In an embodiment, conveyor belt 280 rests on heating element 120. In an embodiment, material 130 rests on conveyor 280. In an embodiment, material 130 rests on setter 135 which in turn rests on conveyor 280. In an embodiment, one of heating elements 110 and 120 may be omitted.

Depending on the embodiment, heating elements 110 and 120 may be carbon plates or carbon paper. In some examples, the carbon plates or carbon paper comprise conductive carbon. Depending on the embodiment, heating elements 110 and 120 may be molybdenum plates or molybdenum paper. In some examples, the molybdenum plates or molybdenum paper may comprise conductive molybdenum. Current may be applied to heat the conductive carbon plates or conductive carbon paper elements at appropriate rates to temperatures to facilitate sintering within the temperature ranges described herein.

In an embodiment, the heating element(s) may be from 1 mm to 2000 mm from the material being sintered. In an embodiment, the heating element(s) may be from 1 mm to 200 mm from the material being sintered. In an embodiment, the heating element(s) may be as close as from 1 mm to 10 mm from the material being sintered. Depending on the embodiment, the distance of the heating element(s) from the material being sintered may be measured in numerous ways, depending on the position of the material relative to the heating element(s) as the material passes along the conveyor.

In an embodiment, the sintering temperature may range from 900° C. to 1200° C. In an embodiment, the sintering temperature may range from 950° C. to 1150° C. In an embodiment, the sintering temperature may range from 1000° C. to 1100° C. In an embodiment, the sintering temperature may range from 1000° C. to 1300° C. In an embodiment, the sintering temperature may range from 1050° C. to 1250° C. In an embodiment, the sintering temperature may range from 1100° C. to 1200° C.

In an embodiment, the time period for heating may range from 5 seconds to 30 minutes. In an embodiment, the time period may range from 5 seconds to 25 minutes. In an embodiment, the time period may range from 5 seconds to 20 minutes. In an embodiment, the time period may range from 5 seconds to 15 minutes. In an embodiment, the time period may range from 5 seconds to 10 minutes. In an embodiment, the time period may range from 5 seconds to 5 minutes. In an embodiment, the time period may range from 5 seconds to 4 minutes. In an embodiment, the time period may range from 5 seconds to 3 minutes. In an embodiment, the time period may range from 5 seconds to 4 minutes. In an embodiment, the time period may range from 5 seconds to 1 minute.

In some examples, the heating elements 110 and 120 may have the same area as the material 130. In some examples, the heating elements 110 and 120 may be longer than, and as wide as the material 130. In some examples, the heating elements 110 and 120 may be the same length as, and be wider than the material 130. In some examples, the heating elements 110 and 120 may be shorter than the material 130. In embodiments in which there is a single heating element, that heating element may have any of the just-described areal relationships to material 130.

In some examples, the material 130 may have a length between about 50 mm and about 300 mm, and a width between about 50 mm and about 300 mm. In some examples, the material 130 may have a length between about 50 mm and about 150 mm, and a width between about 50 mm and about 150 mm. In some examples, the material 130 may have a length between about 60 mm and about 120 mm, and a width between about 60 mm and about 120 mm. about In a specific example, the material 130 may be 64 mm×79 mm after sintering. In a specific example, the material 130 may be about 64 mm×about 80 mm after sintering. In a specific example, the material 130 may be about 64 mm×about 85 mm after sintering. In a specific example, the material may be about 65 mm×about 80 mm after sintering. In a specific example, the material 130 may be about 65 mm×about 85 mm after sintering. In a specific example, the material 130 may be about 75 mm×about 90 mm after sintering. In a specific example, the material 130 may be about 110 mm×about 110 mm after sintering. In a specific example, the material 130 may be about 115 mm×about 115 mm after sintering. In a specific example, the material may be about 110 mm×about 115 mm after sintering.

In some examples, the material densifies and shrinks in size when undergoing a sintering process from a green film on a metal foil to a sintered material on a metal foil. As described herein, the x and y-directions are along the width and length of the green film, and the z-direction is along the height of the green film.

In some cases, the material predominantly shrinks in the z-direction. In some cases, the height of the green film of a bilayer reduces by at least 30%, 40%, 50% or 60%. In some cases, the height of the green film of a bilayer reduces by about 40%, 45%, or 50%.

The thickness of a green bilayer can be measured with a drop gauge or a FIB cut with SEM imaging.

The thickness of a sintered bilayer can be measured by a FIB cut with SEM imaging, ion mill cross section, or dual-side opposing laser interferometry.

In an embodiment, the sintering process is performed under a reducing or inert gas atmosphere. An inert atmosphere may include argon (Ar) or nitrogen ($N_2$). A reducing atmosphere may include Ar mixed with hydrogen ($H_2$) or $N_2$ mixed with $H_2$.

In an embodiment, the sintering process includes using oxidizing agents mixed into the gas or atmosphere which contacts the green tape. These oxidizing agents may include $H_2O$, $O_2$, or clean-dry air. In certain examples, the sintering oven does not include oxidizing agents mixed into the gas or atmosphere which contact the sintering film.

Oxygen, or $O_2$, levels in the gases for a process described herein may be lower than about 100 ppm, 50 ppm, or 10 ppm. Water, or $HO_2$, levels in the gases for a process described herein may be lower than about 100 ppm, 50 ppm, or 10 ppm.

In some examples, the sintering process includes using argon (Ar) gas.

In some examples, the sintering process includes using nitrogen ($N_2$) gas.

In some examples, the sintering process includes using hydrogen ($H_2$) gas. In some examples, the $H_2$ gas is present at about 5% v/v.

In some examples, the sintering process includes using water ($H_2O$) gas.

In an embodiment, the atmosphere within the apparatus is uniform or substantially uniform. The atmosphere of inert gas or mixtures of gases is uniform throughout the apparatus, or at a minimum, uniform above and/or below the material which is to be sintered. In an embodiment, the temperature within the apparatus is uniform or substantially uniform. The temperature of inert gas or mixtures of gases is uniform throughout the apparatus, or at a minimum, uniform above and/or below the material which is to be sintered.

In some examples, the process includes using atmospheric controls with narrow oven openings around the material which is being sintered.

In some examples, using atmospheric controls includes using excess flow at oven inlets and outlets. In some examples, using atmospheric controls includes using a $N_2$ or Ar-filled glove box around various components such as rollers. In some examples, using atmospheric controls includes using overpressures inside ovens.

In some example, using atmospheric controls of the atmospheric pressure inside the tool. In some cases, partial vacuum may be used, wherein the pressure is about 0.01 Torr, 0.1 Torr, or 0.5 Torr. In some cases, air flow may be reintroduced into a system that has a vacuum applied to it.

In some examples, using atmospheric controls includes controlling the amount of $H_2O$ in a heating apparatus. In some examples, using atmospheric controls includes controlling the amount of $O_2$ in a heating apparatus. In some examples, using atmospheric controls includes controlling the amount of $O_2$ in a heating apparatus to levels less than 100 ppm. In some examples, using atmospheric controls includes controlling the amount of $O_2$ in a heating apparatus to levels less than 10 ppm. In some examples, using atmospheric controls includes controlling the amount of $O_2$ in a heating apparatus to levels less than 1 ppm. In some examples, using atmospheric controls includes controlling the amount of $H_2$ in a heating apparatus. In some examples, using atmospheric controls includes controlling the amount of $N_2$ in a heating apparatus.

In some examples, using atmospheric controls includes controlling the amount of $H_2O$ in a heating apparatus. In some examples, using atmospheric controls includes controlling the amount of $H_2O$ in a heating apparatus to levels less than 100 ppm. In some examples, using atmospheric controls includes controlling the amount of $H_2O$ in a heating apparatus to levels less than 10 ppm.

In some examples, using atmospheric controls includes using forming gas in a heating apparatus. In certain examples, the forming gas is a mixture of hydrogen ($H_2$) and Ar. In some examples, using atmospheric controls includes using forming gas in a heating apparatus. In certain examples, the forming gas is a mixture of hydrogen ($H_2$) and nitrogen ($N_2$). In some examples, using atmospheric controls includes using forming gas in a heating apparatus. In certain examples, the forming gas is a mixture of $H_2$, Ar, and $N_2$. In some of these examples, the $H_2$ is a few percent by volume of the forming gas. For example, in certain examples, the $H_2$ is present in the forming gas at 1%, 2%, 3%, 4%, 6%, 7%, 8%, 9%, or 10% by volume. In certain other examples, the $H_2$ is present in the forming gas at about 1%, about 2%, about 3%, about 4%, about 6%, about 7%, about 8%, about 9%, or about 10% by volume. In certain other examples, the $H_2$ is present in the forming gas at about 1-2%, about 2-3%, about 3-4%, about 4-5%, about 6-7%, about 7-8%, about 8-9%, or about 9-10%. In yet other examples, the $H_2$ is present in the forming gas at 1-2%, 2-3%, 3-4%, 4-5%, 6-7%, 7-8%, 8-9%, or 9-10%. In yet other examples, the $H_2$ is present in the forming gas at 1-5%, 2-5%, 3-5%, 5-9%, 5-7%, 4-6%, 3-7%, or 2-8%.

In other examples, using atmospheric controls includes using Ar gas, $N_2$ gas, or a combination thereof in a heating apparatus. In certain examples, the gas is Ar. In some examples, the gas is $N_2$. In other examples, the gas is a mixture of Ar and $N_2$.

In some examples, and in some parts of the manufacturing line, such as the parts of the manufacturing line where sintering is not occurring, using atmospheric controls will include using oxidizing gases. For example, $H_2O$ may be used alone or in combination with the gases in the preceding paragraphs. For example, $O_2$ may be used alone or in combination with the gases in the preceding paragraphs. For example, CDA (clean dry air) may be used alone or in combination with the gases in the preceding paragraphs.

In some examples, using atmospheric controls includes using an enclosure to provide an enclosed environment with atmosphere control around or near a heating apparatus. For example, an enclosure filled with nitrogen with some regions exposed to reducing environment. The reducing environment may be accomplished by providing a partial pressure of $H_2$ or CO.

In some examples, the green tapes are rapidly sintered. The time at which any given part of a film spends at a temperature above room temperature may be from 30 minutes to 10 hours. The time at which any given part of a film spends at a temperature above room temperature may be from 30 minutes to 5 hours. The time at which any given part of a film spends at a temperature above room temperature may be from 1 hour to 5 hours. The time at which any given part of a film spends at a temperature above room temperature may be from 2 hours to 4 hours.

In some examples, the green tapes are rapidly sintered. The time at which any given part of a film spends at sintering temperature may be between 15 seconds and 20 minutes. In other examples, the time at which any given part of a film spends at sintering temperature may be between 1 minute and 10 minutes. In other examples, the time at which any given part of a film spends at sintering temperature may be between 1 minute and 5 minutes. In other examples, the time at which any given part of a film spends at sintering temperature may be between 1 minute and 2 minutes.

To avoid surface contamination of the sintered article, or pre-sintered article as it moves through a continuous manufacturing line (CML), the films may be cooled to less than 40° C. In some examples, the films are maintained in an atmosphere that has a low $H_2O$ content. For example, the $H_2O$ content may be less than 10 ppm. In some examples, the films are maintained in an atmosphere that is mostly argon gas. In some examples, the films are maintained in an atmosphere that is mostly nitrogen gas. In some examples, the films are maintained in clean dry air (CDA).

In some examples, an air box (tunnel configuration) is used with exhaust.

In some examples, an air box with a feedback loop is used to form a gas feed tube and $O_2$ sensor in the heating apparatus.

In some examples, prior to sintering, the material which is to be sintered is subjected to a binder burn-out (BBO). In BBO, organic material in the material is evaporated or combusted away from the material to be sintered. In BBO, the atmosphere in contact with the material to be sintered may be oxidizing. In some examples, the BBO atmosphere is not oxidizing and the organic material evaporates away from the material to be sintered. A BBO step occurs before a sintering step.

Figure 3:
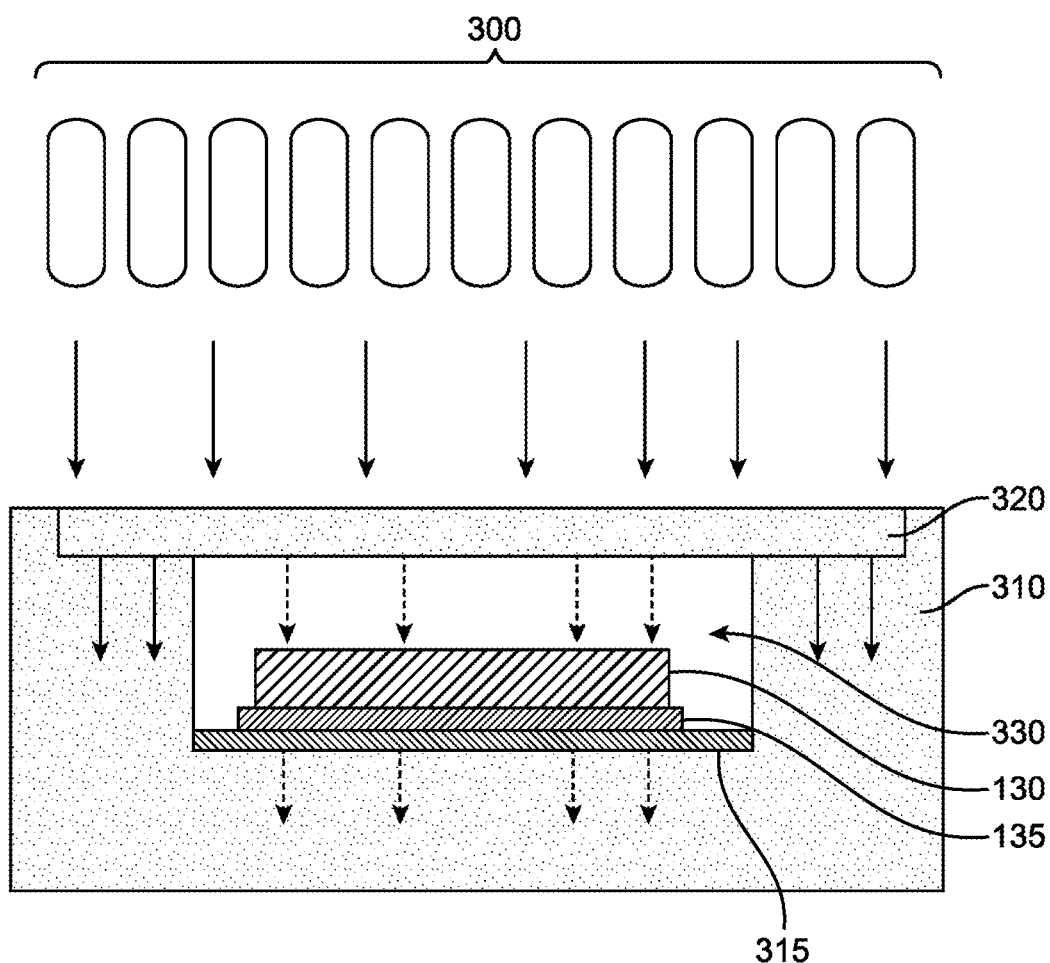
FIG. 3 is a high level view of an apparatus according to an embodiment.

FIG. 3 shows a high level overview of an RTP apparatus and accompanying method according to an embodiment. The apparatus in FIG. 3 uses heat lamps 300 to sinter material 130. In an embodiment, the lamps 300 are halogen lamps. Heat from heat lamps 300 passes through a receptacle 310 holding material 130. In an embodiment, the receptacle may function as a susceptor. In an embodiment, material is placed on a setter 315. In an embodiment, the setter may be omitted. In an embodiment, setter 315 may act as a susceptor.

Non-limiting examples of setters are found, for example, in PCT Published Application No. WO2016168723A1 and WO2016168691A1, both published on Oct. 20, 2016, and in U.S. Pat. No. 10,563,918, which issued on Feb. 18, 2020. The entire contents of the just-mentioned PCT published patent applications and U.S. patent are incorporated herein by reference in their entirety for all purposes.

As described herein, methods of sintering a material can be via a carbon-plate-based heating method, tool, or apparatus. As described herein, methods of sintering a material can be via a lamp-based heating method, tool, or apparatus.

In an embodiment, a lid 320 fits over opening 330. Solid arrows 340 show faster thermal transfer. Dashed arrows 350 show slower thermal transfer. Depending on the embodiment, the lid may transmit greater than 50% of light incident in the wavelength range of 300-700 nm, or in the wavelength range of 800-2500 nm, or in the wavelength range of 2.5-1000 µm, or in the wavelength range of 100-400 nm. In an embodiment, the apparatus may be controlled to flow gas over an interior surface of the lid 320. In an embodiment, lid 320 may be omitted, particularly if the stack comprising the material 130 and setter 315 is relatively thick compared to the height of the opening 330. In an embodiment, material 130 is sintered to form sintered element 140 as shown in FIGS. 1 and 2. As discussed previously, the sintered element 140 may function as a separator in a solid-state battery. In an embodiment, the separator is a solid-state electrolyte. In an embodiment, the separator comprises Li-stuffed garnet.

Figure 5:
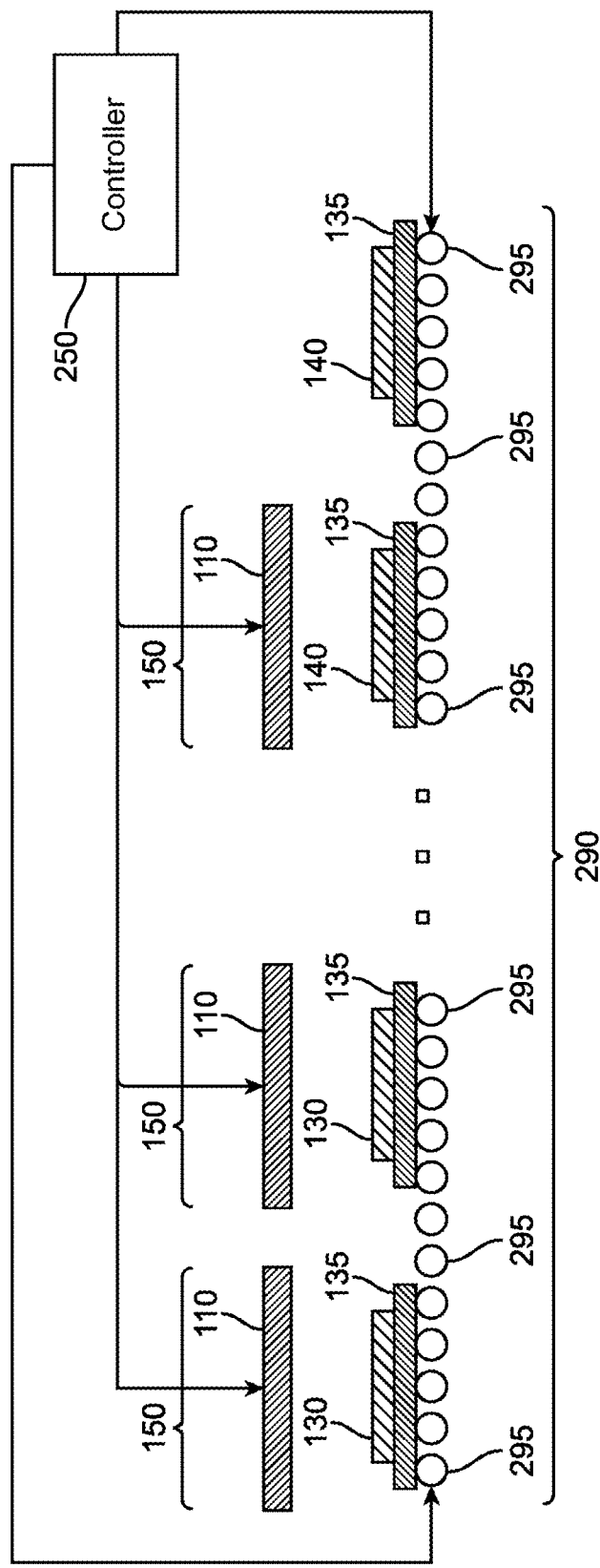
FIG. 5 is a high level view of an apparatus according to an embodiment.

FIG. 5 shows an apparatus to perform rapid thermal processing according to an embodiment. In FIG. 5, controller 250 controls a conveyor 290 comprising a plurality of rollers 295, and a plurality of heating elements 110, each of these heating elements being in a separate zone 150 of the apparatus according to different embodiments as shown. Also in FIG. 5, material 130 is placed on a setter 135. In different embodiments, material 130 may comprise lithium stuffed garnet as discussed previously. In different embodiments, setter 135 may comprise a foil of the types discussed previously, such that material 130 and setter 135 together constitute a bilayer structure which is passed through the apparatus of FIG. 5 to yield sintered material 140 as shown.

Depending on the embodiment, there may more than the three zones 150 that FIG. 5 shows. There may be anywhere from 1 to 50 such zones, depending on the embodiment. One or more central zones in the apparatus may perform sintering of material 130, with preceding zones heating up the material before sintering, and following zones cooling down the material after sintering. Depending on the embodiment, the atmosphere in the various zones may be either wet or dry.

Depending on the embodiment, the conveyor 290 may be one long continuous conveyor, with the rollers 295 following one straight path. Depending on the embodiment, the rollers 295 may be arranged in a path that appears as a square, a rectangle, another polygonal structure, and ellipse, or a circle. In these latter embodiments, the conveyor describes a continuous path in which material may be placed on and removed from the conveyor at nearby points, rather than at the beginning and end, respectively.

Depending on the embodiment, the controller 250 may control the zones 150 individually to define a desired temperature profile for heating and cooling the material 130 and sintered material 140. In an embodiment, a central one or more of zones 150 may sinter the material 130 at a temperature ranging from 9000 to 2000° C. In an embodiment, the temperature may range from 1000° C. to 1900° C. In an embodiment, the temperature may range from 1100° C. to 1800° C. In an embodiment, the temperature may range from 1200° C. to 1700° C. In an embodiment, the temperature may range from 1000° C. to 1700° C. In an embodiment, the temperature may range from 1100° C. to 1600° C. In an embodiment, the temperature may range from 1200° C. to 1500° C. In an embodiment, the temperature may range from 1000° C. to 1400° C. In an embodiment, the temperature may range from 1100° C. to 1300° C. In an embodiment, the temperature may range from 1000° C. to 1200° C.

Depending on the embodiment, the just-discussed temperature profile may heat the material 130 at any of a desired number of rates before the material 130 reaches the zone 150 at which it is sintered. In different embodiments, the rates may vary from 10° C./min to 250° C./min. In different embodiments, the rates may vary from 20° C./min to 200° C./min. In different embodiments, the rates may vary from 25° C./min to 150° C./min. In different embodiments, the rates may vary from 30° C./min to 100° C./min. In different embodiments, the rates may vary from 10° C./min to 50° C./min. In different embodiments, the rates may vary from 15° C./min to 45° C./min. In different embodiments, the rates may vary from 20° C./min to 40° C./min. In different embodiments, the rates may vary from 10° C./min to 40° C./min. In different embodiments, the rates may vary from 15° C./min to 35° C./min. In different embodiments, the rates may vary from 20° C./min to 30° C./min.

While some figures herein show a bilayer structure being conveyed through a furnace, in embodiments there is additional structure surrounding the bilayer structure. Some of this structure may be referred to as furniture. In embodiments, one piece of furniture underlies the bilayer structure, and the other piece of furniture overlies the bilayer structure. In different embodiments, these pieces of furniture are planar or plate-shaped, with length and width greater than that of the bilayer structure sandwiched therebetween.

Depending on the embodiment, material in the furniture used to convey the Bilayer structure through the series of furnace zones may be selected from the group consisting of alumina ($Al_2O_3$), zirconium toughened alumina (ZTA), mullite ($3Al_2O_3 2SiO_2$ or $2Al_2O_3 SiO_2$), aluminum nitride (AlN), or silicon carbide (SiC). In an embodiment, the portion of the furniture overlying the Bilayer structure may be made of a different one of the just-mentioned materials than the portion of the furniture between the conveyor and the bilayer structure. Merely by way of example, if the furniture is made of alumina, one piece may be made of printed alumina, and one may be made of dense alumina.

In some embodiments, a frame is disposed between the upper piece of furniture and the bilayer structure, so that the film does not come into contact with the upper piece of furniture. Depending on the embodiment, material in the frame disposed between the furniture and the foil may be selected from the group consisting of porous alumina, an alumina-zirconia blend, lithium aluminate, lithium tantalate, alumina, silica, silicate such as cordierite, Ni, iron alloys, nickel alloys, cobalt alloys, iron nickel cobalt alloys, or combinations thereof. In an embodiment, the frame material may be textured on one or both sides. Texturing can reduce the contact area between the frame and the foil, allowing for a greater BBO pathway. In an embodiment, the texturing may comprise vertical grooves in the frame. In an embodiment, the texturing may comprise horizontal grooves in the frame. In an embodiment, the texturing may comprise horizontal and vertical grooves in the frame. In an embodiment, grooves may be placed periodically (that is, equidistant from each other). In an embodiment in which the material is textured on one side, the texturing may face the material.

Figure 6C:
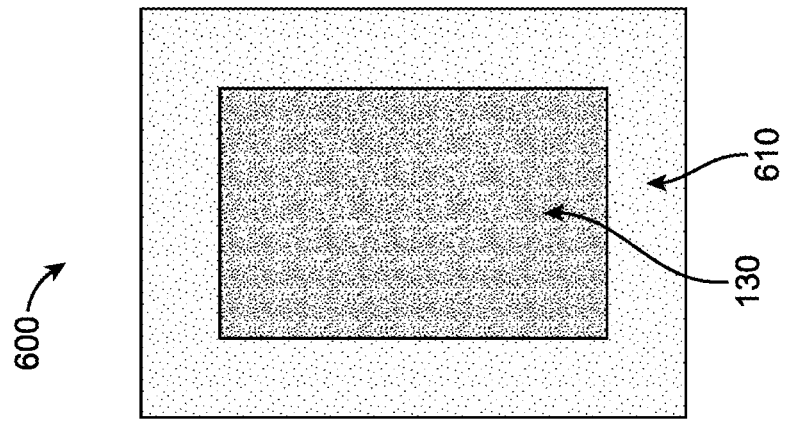
FIGS. 6A-6C are views of structure used to facilitate processing of a bilayer structure for passage through a rapid thermal processing apparatus according to an embodiment.
Figure 6B:
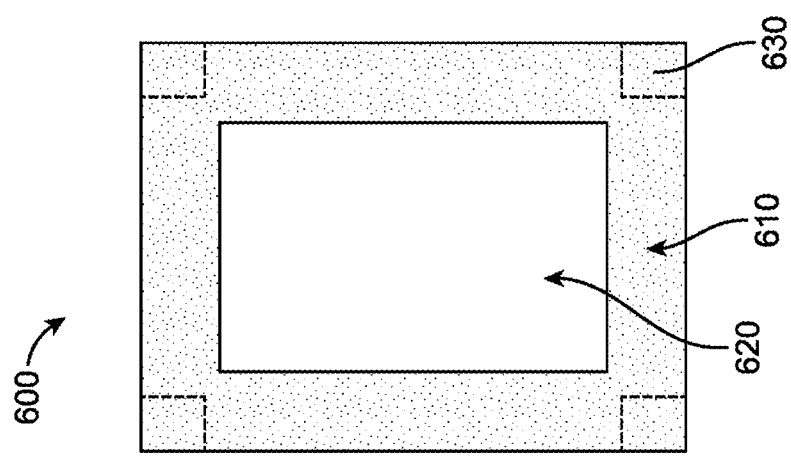
Figure 6A:
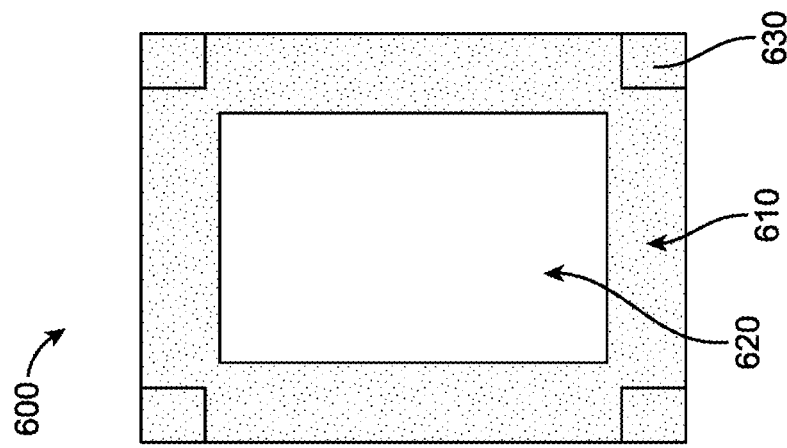

FIGS. 6A and 6B show respective top and bottom views of a frame structure according to different embodiments. In FIG. 6A, frame structure 600 comprises frame 610 with an opening 620. There are accompanying pieces 630 extending beneath the frame 610. Interposing the frame 610 between the overlying furniture piece and the bilayer structure keeps a central portion of the material in the bilayer structure from contacting that portion of the furniture. When the bilayer structure is assembled within furniture for sintering, the pieces 630 will contact the bilayer structure to keep the frame 610 from contacting the bilayer structure. FIG. 6B shows a top view of the frame structure 600, with pieces 630 shown in dotted lines on an underside of frame 610. FIG. 6C shows a view with frame 610 overlying material 130.

Figure 7B:
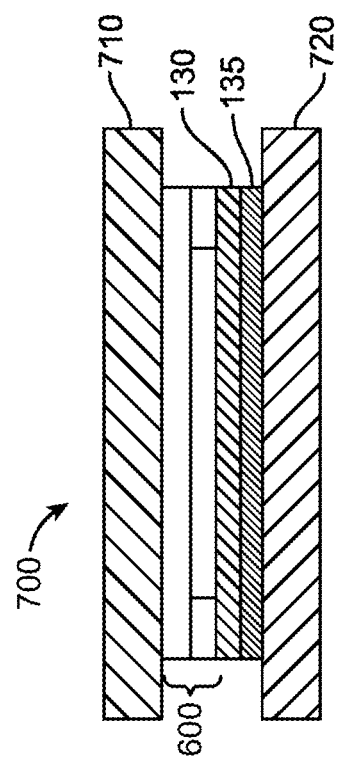
FIGS. 7A and 7B are different views of a bilayer assembly to be passed through a rapid thermal processing apparatus according to an embodiment.
Figure 7A:
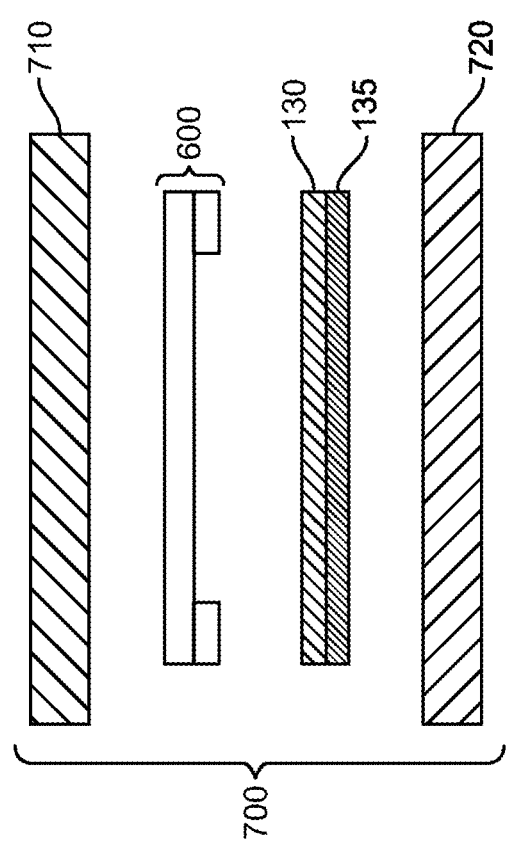

FIGS. 7A and 7B show structure 700 to be placed into a furnace according to different embodiments. FIG. 7A is an exploded view, and FIG. 7B is an assembled view. In these figures, bilayer structure comprising material 130 and foil 135 is disposed over a lower furniture plate 720. Frame structure 600 is disposed over the bilayer structure. An upper furniture plate 710 is disposed over frame structure 600. In the accompanying description of various embodiments herein, the upper and lower furniture plates 710, 720 may be referred to collectively as furniture.

Figure 8:
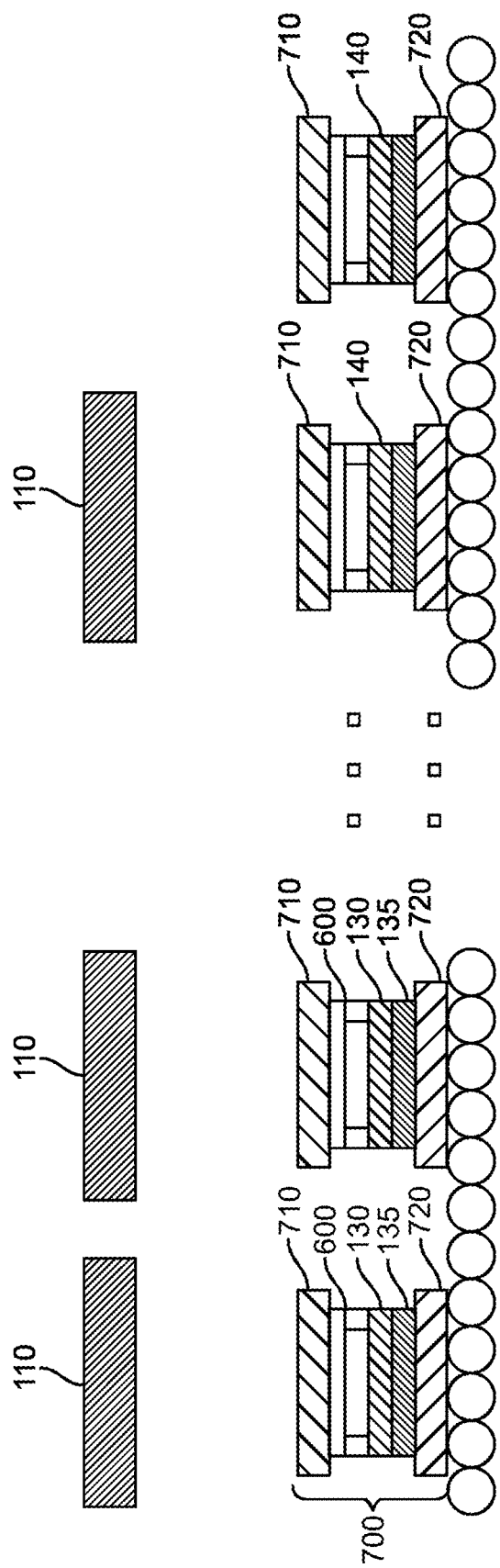
FIG. 8 is a high level view of an apparatus according to an embodiment.

FIG. 8 shows structure corresponding to a portion of FIG. 5, with structure 700 as shown in FIGS. 7A and 7B passing through the furnace to produce sintered material 140.

During sintering, the bilayer can be oriented one of two ways, relative to the ground: green film on top with metal foil on bottom, or metal foil on top with green film on the bottom. Examples described herein have the metal foil on the bottom, in order to minimize interactions with a setter or support, and the green film is on top so binder can leave the film during binder burnout heating.

Depending on the embodiment, the furniture may have a range of dimensions between 50×50 mm and 200×200 mm. The furniture may have dimensions of up to 300×300 mm. The furniture need not be square. In an embodiment, the width of the furniture may be about 50 mm. In an embodiment, the width of the furniture may be about 60 mm. In an embodiment, the width of the furniture may be about 70 mm. In an embodiment, the width of the furniture may be about 80 mm. In an embodiment, the width of the furniture may be about 90 mm. In an embodiment, the width of the furniture may be about 100 mm. In an embodiment, the width of the furniture may be about 110 mm. In an embodiment, the width of the furniture may be about 120 mm. In an embodiment, the width of the furniture may be about 130 mm. In an embodiment, the width of the furniture may be about 140 mm. In an embodiment, the width of the furniture may be about 150 mm. In an embodiment, the width of the furniture may be about 160 mm. In an embodiment, the width of the furniture may be about 170 mm. In an embodiment, the width of the furniture may be about 180 mm. In an embodiment, the width of the furniture may be about 190 mm. In an embodiment, the width of the furniture may be about 200 mm. Increments of less than 10 mm also may be used for the width of the furniture, depending on the embodiment.

In an embodiment, the length of the furniture may be about 50 mm. In an embodiment, the length of the furniture may be about 60 mm. In an embodiment, the length of the furniture may be about 70 mm. In an embodiment, the length of the furniture may be about 80 mm. In an embodiment, the length of the furniture may be about 90 mm. In an embodiment, the length of the furniture may be about 100 mm. In an embodiment, the length of the furniture may be about 110 mm. In an embodiment, the length of the furniture may be about 120 mm. In an embodiment, the length of the furniture may be about 130 mm. In an embodiment, the length of the furniture may be about 140 mm. In an embodiment, the length of the furniture may be about 150 mm. In an embodiment, the length of the furniture may be about 160 mm. In an embodiment, the length of the furniture may be about 170 mm. In an embodiment, the length of the furniture may be about 180 mm. In an embodiment, the length of the furniture may be about 190 mm. In an embodiment, the length of the furniture may be about 200 mm. Increments of less than 10 mm also may be used for the length of the furniture, depending on the embodiment.

Depending on the embodiment, the foil may have a range of dimensions between about 40×40 mm to about 190×190 mm. The furniture need not be square. In an embodiment, the width of the furniture may be about 40 mm. In an embodiment, the width of the furniture may be about 50 mm. In an embodiment, the width of the furniture may be about 60 mm. In an embodiment, the width of the furniture may be about 70 mm. In an embodiment, the width of the furniture may be about 80 mm. In an embodiment, the width of the furniture may be about 90 mm. In an embodiment, the width of the furniture may be about 100 mm. In an embodiment, the width of the furniture may be about 110 mm. In an embodiment, the width of the furniture may be about 120 mm. In an embodiment, the width of the furniture may be about 130 mm. In an embodiment, the width of the furniture may be about 140 mm. In an embodiment, the width of the furniture may be about 150 mm. In an embodiment, the width of the furniture may be about 160 mm. In an embodiment, the width of the furniture may be about 170 mm. In an embodiment, the width of the furniture may be about 180 mm. In an embodiment, the width of the furniture may be about 190 mm. Increments of less than 10 mm also may be used for the width of the furniture, depending on the embodiment.

In an embodiment, the length of the foil is larger than about 50 mm. In an embodiment, the length of the foil may be about 60 mm. In an embodiment, the length of the foil may be about 70 mm. In an embodiment, the length of the foil may be about 80 mm. In an embodiment, the length of the foil may be about 90 mm. In an embodiment, the length of the foil may be about 100 mm. In an embodiment, the length of the foil may be about 110 mm. In an embodiment, the length of the foil may be about 120 mm. In an embodiment, the length of the foil may be about 130 mm. In an embodiment, the length of the foil may be about 140 mm. In an embodiment, the length of the foil may be about 150 mm. In an embodiment, the length of the foil may be about 160 mm. In an embodiment, the length of the foil may be about 170 mm. In an embodiment, the length of the foil may be about 180 mm. In an embodiment, the length of the foil may be about 190 mm. In general, any length between 40 mm and 190 mm may be used for the length of the foil, depending on the embodiment. In general, the foil may be a singular sheet of metal foil and not a ribbon of significantly longer length than width.

Another way of looking at the size of the foil compared to the size of the furniture is the distance on each side between the perimeter of the foil and the perimeter of the furniture. In an embodiment, the distance on each side between the foil and the furniture may be about 5 mm. In an embodiment, the distance on each side between the foil and the furniture may be about 6 mm. In an embodiment, the distance on each side between the foil and the furniture may be about 7 mm. In an embodiment, the distance on each side between the foil and the furniture may be about 8 mm. In an embodiment, the distance on each side between the foil and the furniture may be about 9 mm. In an embodiment, the distance on each side between the foil and the furniture may be about 10 mm. In an embodiment, the distance on each side between the foil and the furniture may be about 11 mm. In an embodiment, the distance on each side between the foil and the furniture may be about 12 mm. In an embodiment, the distance on each side between the foil and the furniture may be about 13 mm. In an embodiment, the distance on each side between the foil and the furniture may be about 14 mm. In an embodiment, the distance on each side between the foil and the furniture may be about 15 mm. In an embodiment, the distance on each side between the foil and the furniture may be about 16 mm. In an embodiment, the distance on each side between the foil and the furniture may be about 17 mm. In an embodiment, the distance on each side between the foil and the furniture may be about 18 mm. In an embodiment, the distance on each side between the foil and the furniture may be about 19 mm. In an embodiment, the distance on each side between the foil and the furniture may be about 20 mm.

In an embodiment, outer dimensions of the frame may be the same as the dimensions of the foil. A width of each side of the frame may vary, depending on the degree necessary to provide suitable separation from the upper portion of the furniture. In an embodiment, a width of each side of the frame may be about 1 mm. In an embodiment, a width of each side of the frame may be about 1.5 mm. In an embodiment, a width of each side of the frame may be about 2 mm. In an embodiment, a width of each side of the frame may be about 2.5 mm. In an embodiment, a width of each side of the frame may be about 3 mm. In an embodiment, a width of each side of the frame may be about 3.5 mm. In an embodiment, a width of each side of the frame may be about 4 mm. In an embodiment, a width of each side of the frame may be about 4.5 mm. In an embodiment, a width of each side of the frame may be about 5 mm. In an embodiment, a width of each side of the frame may be about 5.5 mm. In an embodiment, a width of each side of the frame may be about 6 mm.

In some examples, including any of the foregoing, the solid-state electrolyte has a rectangular shape with two surfaces, which are the top and bottom surfaces, having the highest geometric surface area. As used herein, geometric surface area is the length multiplied by the width of the area of the surface considered, and assuming flat surfaces. At about 900 angles to the top and bottom surfaces are four edge-surfaces, each of which has a geometric surface area less than the geometric surface area of either the top or bottom surface. In these examples, two of the four edge-surfaces will have a smaller geometric surface area than the other two of the four edge-surfaces.

In some examples, including any of the foregoing, the solid-state electrolyte has a square shape with two surfaces, which are the top and bottom surfaces, having the highest geometric surface area. At about 90° angles to the top and bottom surfaces are four edge-surfaces, each of which has a geometric surface area less than the geometric surface area of either the top or bottom surface. In these examples, the four edge-surfaces will have approximately equal surface areas.

In some examples, including any of the foregoing, the green bilayer has a thickness of 1 μm-100 μm. In some examples, the green bilayer has a thickness of 20 μm-100 μm. In some examples, the green bilayer has a thickness of 40 μm-100 μm. In some examples, the green bilayer has a thickness of 20 μm-80 μm. In some examples, the green bilayer has a thickness of µm-80 µm. In some examples, the green bilayer has a thickness of 20 µm-60 µm. In some examples, the green bilayer has a thickness of 10 µm-50 µm. In some In some examples, the green bilayer has a thickness of 10 µm-40 µm. In some examples, the green bilayer has a thickness of 10 µm-30 µm. In some examples, the green bilayer has a thickness of about 10 µm. In some examples, the green bilayer has a thickness of about 11 µm. In some examples, the green bilayer has a thickness of about 12 µm. In some examples, the green bilayer has a thickness of about 13 µm. In some examples, the green bilayer has a thickness of about 14 am. In some examples, the green bilayer has a thickness of about 15 µm. In some examples, the green bilayer has a thickness of about 16 µm. In some examples, the green bilayer has a thickness of about 17 µm. In some examples, the green bilayer has a thickness of about 18 am. In some examples, the green bilayer has a thickness of about 19 am. In some examples, the green bilayer has a thickness of about 20 µm. In some examples, the green bilayer has a thickness of about 21 µm. In some examples, the green bilayer has a thickness of about 22 am. In some examples, the green bilayer has a thickness of about 23 µm. In some examples, the green bilayer has a thickness of about 24 µm. In some examples, the green bilayer has a thickness of about 25 am. In some examples, the green bilayer has a thickness of about 26 am. In some examples, the green bilayer has a thickness of about 27 am. In some examples, the green bilayer has a thickness of about 28 µm. In some examples, the green bilayer has a thickness of about 29 am. In some examples, the green bilayer has a thickness of about 30 am. In some examples, the green bilayer has a thickness of about 31 am. In some examples, the green bilayer has a thickness of about 32 µm. In some examples, the green bilayer has a thickness of about 33 µm. In some examples, the green bilayer has a thickness of about 34 am. In some examples, the green bilayer has a thickness of about 35 am. In some examples, the green bilayer has a thickness of about 36 am. In some examples, the green bilayer has a thickness of about 37 µm. In some examples, the green bilayer has a thickness of about 38 µm. In some examples, the green bilayer has a thickness of about 39 µm. In some examples, the green bilayer has a thickness of about 40 µm.

In some examples, including any of the foregoing, the sintered bilayer has a thickness of 1 µm-100 µm. In some examples, the sintered bilayer has a thickness of 20 µm-100 µm. In some examples, the sintered bilayer has a thickness of 40 µm-100 µm. In some examples, the sintered bilayer has a thickness of 20 µm-80 µm. In some examples, the sintered bilayer has a thickness of 40 µm-80 µm. In some examples, the sintered bilayer has a thickness of 20 µm-60 µm. In some examples, the sintered bilayer has a thickness of 10 µm-50 µm. In some examples, the sintered bilayer has a thickness of 10 µm-40 µm. In some examples, the sintered bilayer has a thickness of 10 µm-30 µm. In some examples, the sintered bilayer has a thickness of about 10 µm. In some examples, the sintered bilayer has a thickness of about 11 µm. In some examples, the sintered bilayer has a thickness of about 12 µm. In some examples, the sintered bilayer has a thickness of about 13 µm. In some examples, the sintered bilayer has a thickness of about 14 µm. In some examples, the sintered bilayer has a thickness of about 15 µm. In some examples, the sintered bilayer has a thickness of about 16 µm. In some examples, the sintered bilayer has a thickness of about 17 µm. In some examples, the sintered bilayer has a thickness of about 18 µm. In some examples, the sintered bilayer has a thickness of about 19 µm. In some examples, the sintered bilayer has a thickness of about 21 µm. In some examples, the sintered bilayer has a thickness of about 22 µm. In some examples, the sintered bilayer has a thickness of about 23 µm. In some examples, the sintered bilayer has a thickness of about 24 µm. In some examples, the sintered bilayer has a thickness of about 25 µm. In some examples, the sintered bilayer has a thickness of about 26 µm. In some examples, the sintered bilayer has a thickness of about 27 µm. In some examples, the sintered bilayer has a thickness of about 28 µm. In some examples, the sintered bilayer has a thickness of about 29 µm. In some examples, the sintered bilayer has a thickness of about 30 µm. In some examples, the sintered bilayer has a thickness of about 31 µm. In some examples, the sintered bilayer has a thickness of about 32 µm. In some examples, the sintered bilayer has a thickness of about 33 µm. In some examples, the sintered bilayer has a thickness of about 34 µm. In some examples, the sintered bilayer has a thickness of about 35 µm. In some examples, the sintered bilayer has a thickness of about 36 µm. In some examples, the sintered bilayer has a thickness of about 37 µm. In some examples, the sintered bilayer has a thickness of about 38 µm. In some examples, the sintered bilayer has a thickness of about 39 µm. In some examples, the sintered bilayer has a thickness of about 40 µm. In some examples, the sintered bilayer has a maximum thickness of about 40 µm.

In some embodiments, as the solid-state electrolyte undergoes sintering, the height of the film (along the z axis) decreases, while the width and length of the film (along the x and y axes, respectively) stays about constant. Depending on the embodiment, the film may shrink by between about 30 and about 40 percent as a result of sintering. Thus, for example, for a thin film with a film thickness of about 100 µm, the sintered film may have a thickness of between about 60 µm and about 70 µm.

In some examples, the solid-state electrolyte may have dimensions of about 64 mm×about 79 mm. In some examples, the solid-state electrolyte may have dimensions of about (64±x) mm×about (79.5±y) mm, wherein x and y are between 1 and 10 mm.

The processes and apparatus disclosed herein may be used to sinter lithium-stuffed garnet on a metal foil. In some examples, the metal foil is a densified metal layer. In certain examples, the metal foil is a densified metal layer that also includes a ceramic. In some of these examples, the ceramic is a lithium-stuffed garnet.

In certain examples, the lithium-stuffed garnet (LLZO) is sintered on a metal foil. In some of these examples, the metal foil is pure Ni. In some of these examples, the metal foil is a combination of Ni and Fe. In some of these examples, the metal foil has a Ni concentration of 85-95% and an Fe concentration of 5-20%. In some of these examples, the metal foil has a Ni concentration of 90-95% and an Fe concentration of 5-10%. In some of these examples, the metal foil is Ni/Fe 93%/7%. In some of these examples, the metal foil is Ni/Fe 95%/5%. In some of these examples, the metal foil is Ni/Fe 97%/3%.

In certain examples, the LLZO is sintered on a metal foil. In some of these examples, the metal foil is pure Cu. In some of these examples, the metal foil is Cu/Fe 93%/7%. In some of these examples, the metal foil is a combination of Cu and Fe.

In some examples, including any of the foregoing, the sintered article comprises a bilayer. In examples, the bilayer includes a metal foil and a ceramic film. In some examples, the sintered article comprises a trilayer. In some examples, the metal is Ni. In some examples, the Ni is about 1 µm thick. In some examples, the Ni is about 2 μm thick. In some examples, the Ni is about 3 μm thick. In some examples, the Ni is about 4 μm thick. In some examples, the Ni is about 5 μm thick. In some examples, the Ni is about 6 μm thick. In some examples, the Ni is about 7 μm thick. In some examples, the Ni is about 8 μm thick. In some examples, the Ni is about 9 μm thick. In some examples, the Ni is about 10 μm thick. In some examples, the Ni is about 11 μm thick. In some examples, the Ni is about 12 μm thick. In some examples, the Ni is about 13 μm thick. In some examples, the Ni is about 14 μm thick. In some examples, the Ni is about 15 μm thick. In some examples, the Ni is about 16 μm thick. In some examples, the Ni is about 17 μm thick. In some examples, the Ni is about 18 μm thick. In some examples, the Ni is about 19 μm thick. In some examples, the Ni is about 20 μm thick.

In some examples, a slurry may be deposited onto a piece of foil, forming a green tape with a foil backing. In some examples, the foil is a Mylar foil. The green tape with foil backing may be wound up into a roll, forming a roll of unsintered film with a foil backing. The roll of unsintered film with a foil backing may be loaded onto an apparatus as described herein. In some examples, a method of using the apparatus may include: (a) loading a roll of unsintered film with a foil backing on a front roller, (b) unrolling the unsintered film, (c) sintering the unsintered film to produce a sintered film with a foil backing, and (d) rolling the sintered film with a foil backing onto an end roller, wherein the operations are conducted in a controlled atmosphere. In some examples, the foil backing may comprise nickel metal or nickel foil.

In some examples, the green film sintered using the apparatus is a bilayer or a trilayer.

In some examples, various layer architectures can be envisioned and sintered according to the sintering methods set forth herein: A) free-standing lithium stuffed garnet material; B) free-standing lithium stuffed garnet material which optionally includes an active material, a binder, a solvent, and/or carbon; C) a bilayer having one layer of a lithium stuffed garnet and one layer of a metal powder, foil or sheet; D) a bilayer having one layer of a lithium stuffed garnet and one layer comprising a metal powder, foil or sheet, E) a bilayer having one layer of a lithium stuffed garnet material which optionally includes an active material, a binder, a solvent, and/or carbon and one layer of a metal powder, foil, or sheet; F) a trilayer having two layers of a lithium stuffed garnet and one layer of a metal powder, foil or sheet, between and in contact with the garnet layers; G) a trilayer having two layers of a lithium stuffed garnet and one layer comprising a metal powder, foil or sheet, between and in contact with the garnet layers; and H) a trilayer having two layers of a lithium stuffed garnet material wherein each garnet layer optionally includes an active material, a binder, a solvent, and/or carbon and one layer of a metal powder, foil, or sheet, between and in contact with the garnet layers.

In some cases, a bilayer may be sintered using an apparatus described herein. In some cases, a trilayer may be sintered using a CML described herein.

A trilayer may comprise a layer of lithium-stuffed garnet, a metal layer, and a second layer of lithium-stuffed garnet on the opposite side of the metal layer. A trilayer film may pass through the apparatus with a layer of lithium-stuffed garnet facing up and the second layer of lithium-stuffed garnet facing down.

A bilayer may comprise a layer of lithium-stuffed garnet and a layer of metal foil. A bilayer film may pass through the apparatus with a layer of lithium-stuffed garnet facing up (i.e. with the metal layer on the bottom), or may pass through the apparatus with the layer of lithium-stuffed garnet facing down (i.e. with the metal layer on top).

In an embodiment, the previously discussed foil on which the material 130 (in an embodiment, lithium stuffed garnet) is placed may be a metal or metal alloy selected from the group consisting of nickel, iron, molybdenum, titanium, tungsten, and copper, and alloys and combinations thereof.

In some examples, the metal foil or metal layer is nickel, steel, stainless steel, copper, iron, aluminum, titanium, tungsten, molybdenum, Kovar, Invar, ceramic, Haynes216, or a combination thereof.

In some examples, a metal layer comprises Ni, Fe, Cu, Al, Sn, Mo, steel, alloys, or combinations thereof. For example, the metal layer may include Ni and Fe. For example, the metal layer may include about 70% Ni and about 30% Fe. For example, the metal layer may include Ni and Fe. For example, the metal layer may include about 80% Ni and about 20% Fe. For example, the metal layer may include Ni and Fe. For example, the metal layer may include about 90% Ni and about 10% Fe. For example, the metal layer may include about 91% Ni and about 9% Fe. For example, the metal layer may include about 92% Ni and about 8% Fe. For example, the metal layer may include about 93% Ni and about 7% Fe. For example, the metal layer may include about 94% Ni and about 6% Fe. For example, the metal layer may include about 95% Ni and about 5% Fe. For example, the metal layer may include 9 about 6% Ni and about 4% Fe. For example, the metal layer may include about 97% Ni and about 3% Fe. For example, the metal layer may include about 98% Ni and about 2% Fe. For example, the metal layer may include about 99% Ni and about 1% Fe. In some examples, a metal layer is a sheet of metal. In some examples, a metal layer is a sheet of aluminum. In some examples, a metal layer is a sheet of nickel. In some examples, a metal layer may be malleable.

Figure 16:
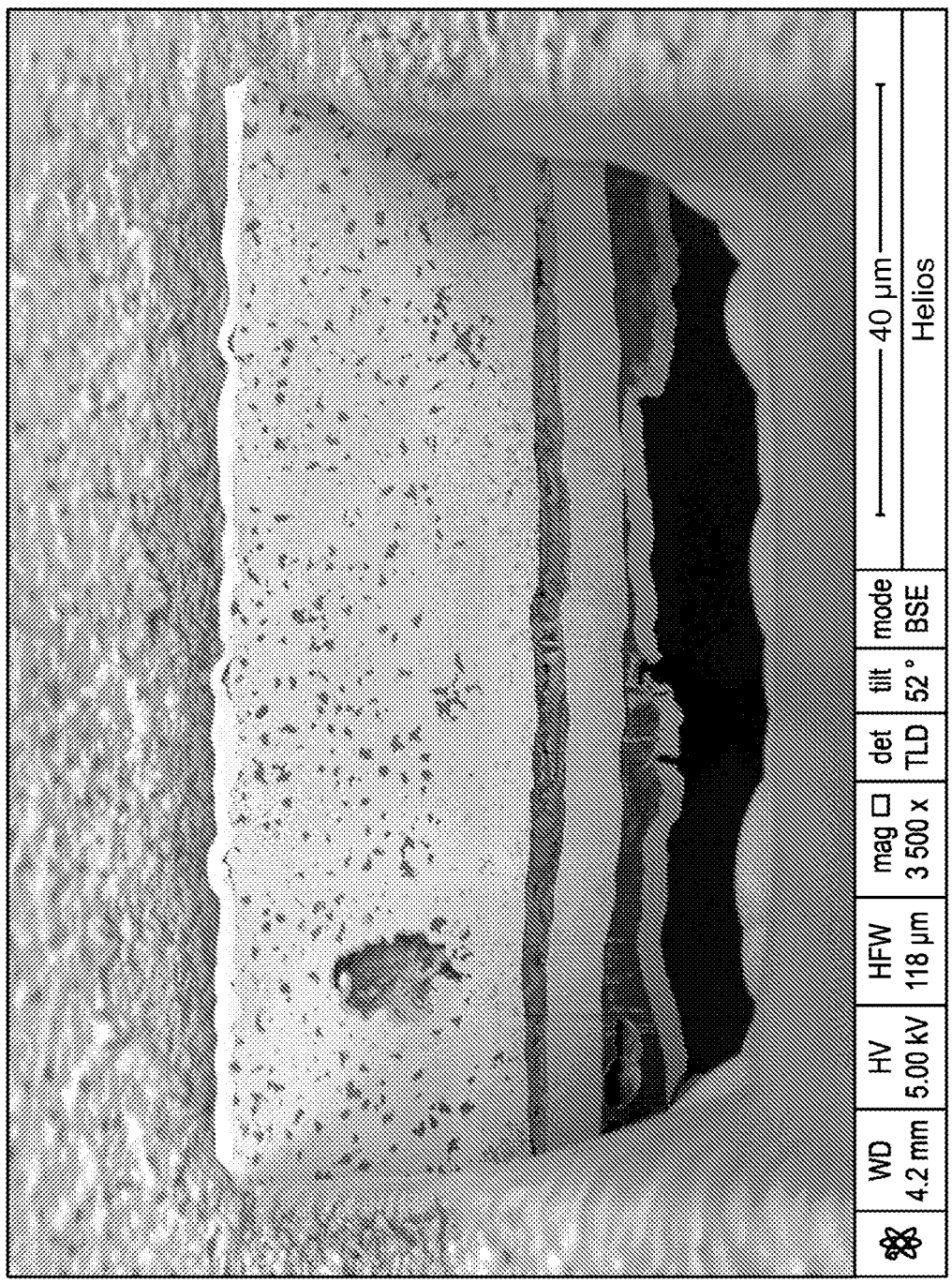
FIG. 16 shows an example of a film made according to an embodiment.

For example, the metal layer may include up to 20% Fe. FIG. 16 shows an example of a film made according to an embodiment wherein the amount of Fe in the Ni/Fe alloy foil was greater than 20%.

In some examples, the metal layer is about 1 μm thick. In some examples, the metal layer is about 2 μm thick. In some examples, the metal layer is about 3 μm thick. In some examples, the metal layer is about 4 μm thick. In some examples, the metal layer is about 5 μm thick. In some examples, the metal layer is about 6 μm thick. In some examples, the metal layer is about 7 μm thick. In some examples, the metal layer is about 8 μm thick. In some examples, the metal layer is about 9 μm thick. In some examples, the metal layer is about 10 μm thick. In some examples, the metal layer is about 11 μm thick. In some examples, the metal layer is about 12 μm thick. In some examples, the metal layer is about 13 μm thick. In some examples, the metal layer is about 14 μm thick. In some examples, the metal layer is about 15 μm thick. In some examples, the metal layer is about 16 μm thick. In some examples, the metal layer is about 17 μm thick. In some examples, the metal layer is about 18 μm thick. In some examples, the metal layer is about 19 μm thick. In some examples, the metal layer is about 20 μm thick. In some examples, the metal layer is made by electrodeposition. In some examples, the metal layer is made by roll annealing. In some examples, the metal layer is a bilayer of two metals. In some examples, a metal bilayer may be made by electrodepositing, sputtering, or evaporating a top metal layer on a metal foil.

In some examples, the lithium-stuffed garnet-metal sintered films herein are from about 1 μm to about 100 μm in thickness. In certain examples, these films are co-sintered with a mixed amount of lithium-stuffed garnet and a metal. The metal may be selected from the group consisting of Ni, Mg, Li, Fe, Al, Cu, Mo, Ti, steel, alloys thereof, and combinations thereof. The lithium-stuffed garnet and metal are mixed as powders and then co-sintered to form a film. In some examples, the film includes a uniform mixture of lithium-stuffed garnet and metal. The relative amounts of lithium-stuffed garnet and metal may vary by volume percent from about 1% lithium-stuffed garnet up to about 99% lithium-stuffed garnet with the remainder being the metal.

In some examples, including any of the foregoing, lithium-stuffed garnet is sintered onto a ceramic-metal film.

Depending on the embodiments, the materials described herein may undergo sintering within a process window, which may be defined as a window within which material such as lithium stuffed garnet may be sintered without creating substantial domains, and with suitable porosity. Depending on the embodiment, variables which may be used to define a suitable process window may be related to a profile of the furnace in which the sintering is to be accomplished, and to the formulation to be sintered. Among these variables are:

Furnace Profile:
  Sinter Temperature
  Sinter Ramp Rate
  Sinter Dwell Time (in a particular zone or zones, and/or overall time in the furnace)
  BBO Temperature
  BBO Ramp Rate
  BBO Dwell Time (in a particular zone or zones, and/or overall time in the furnace)
  Cooldown Rate
Formulation:
  Green Density
  Powder Batch
  Ceramic Particle Size Looking at the furnace profile, depending on the embodiment there may be a parameter set, which may be part of what defines the process window, within which sintering may be carried out successfully, that is, with little to no domain formation, and with suitable porosity (in some embodiments, less than one percent). In some embodiments, various combinations of sintering dwell time and ramp rate may define the process window. In different embodiments, sintering dwell time may vary from 1 to 10 minutes, and ramp rate may vary from 6° C. to 24° C./minute. In different embodiments, sintering dwell time may be 1 minute, and ramp rate may vary from 6° C. to 24° C./minute. In different embodiments, sintering dwell time may be 2 minutes, and ramp rate may vary from 6° C. to 24° C./minute. In different embodiments, sintering dwell time may be 3 minutes, and ramp rate may vary from 6° C. to 24° C./minute. In different embodiments, sintering dwell time may be 4 minutes, and ramp rate may vary from 6° C. to 24° C./minute. In different embodiments, sintering dwell time may be 5 minutes, and ramp rate may vary from 6° C. to 24° C./minute. In different embodiments, sintering dwell time may be 6 minutes, and ramp rate may vary from 6° C. to 24° C./minute. In different embodiments, sintering dwell time may be 7 minutes, and ramp rate may vary from 6° C. to 24° C./minute. In different embodiments, sintering dwell time may be 8 minutes, and ramp rate may vary from 6° C. to 24° C./minute. In different embodiments, sintering dwell time may be 9 minutes, and ramp rate may vary from 6° C. to 24° C./minute. In different embodiments, sintering dwell time may be 10 minutes, and ramp rate may vary from 6° C. to 24° C./minute. In different embodiments, sintering dwell time may be 1 minute, and ramp rate may vary from 6° C. to 24° C./minute. In different embodiments, sintering dwell time may be 2 minutes, and ramp rate may vary from 6° C. to 24° C./minute. In different embodiments, sintering dwell time may be 3 minutes, and ramp rate may vary from 6° C. to 24° C./minute. In different embodiments, sintering dwell time may be 4 minutes, and ramp rate may vary from 6° C. to 24° C./minute. In different embodiments, sintering dwell time may be 5 minutes, and ramp rate may vary from 6° C. to 24° C./minute. In different embodiments, sintering dwell time may be 6 minutes, and ramp rate may vary from 6° C. to 24° C./minute. In different embodiments, sintering dwell time may be 7 minutes, and ramp rate may vary from 6° C. to 24° C./minute. In different embodiments, sintering dwell time may be 8 minutes, and ramp rate may vary from 6° C. to 24° C./minute. In different embodiments, sintering dwell time may be 9 minutes, and ramp rate may vary from 6° C. to 24° C./minute. In different embodiments, sintering dwell time may be 10 minutes, and ramp rate may vary from 6° C. to 24° C./minute.

For each of the just-mentioned sintering dwell times, depending on the embodiment, the ramp rate may be at least 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 50° C., 75° C., 100° C., 125° C., 150° C., 175° C., or 200° C./minute. In some embodiments, a ramp rate of at least 25° C./minute, 50° C./minute, 75° C./minute, 100° C./minute, 125° C./minute, or 150° C./minute may be used, depending on the tool. As ordinarily skilled artisans will appreciate, changing the ramp rate will influence a number of other factors in the process, such as sintering dwell times, gas flow, furniture, etc.

Figure 17:
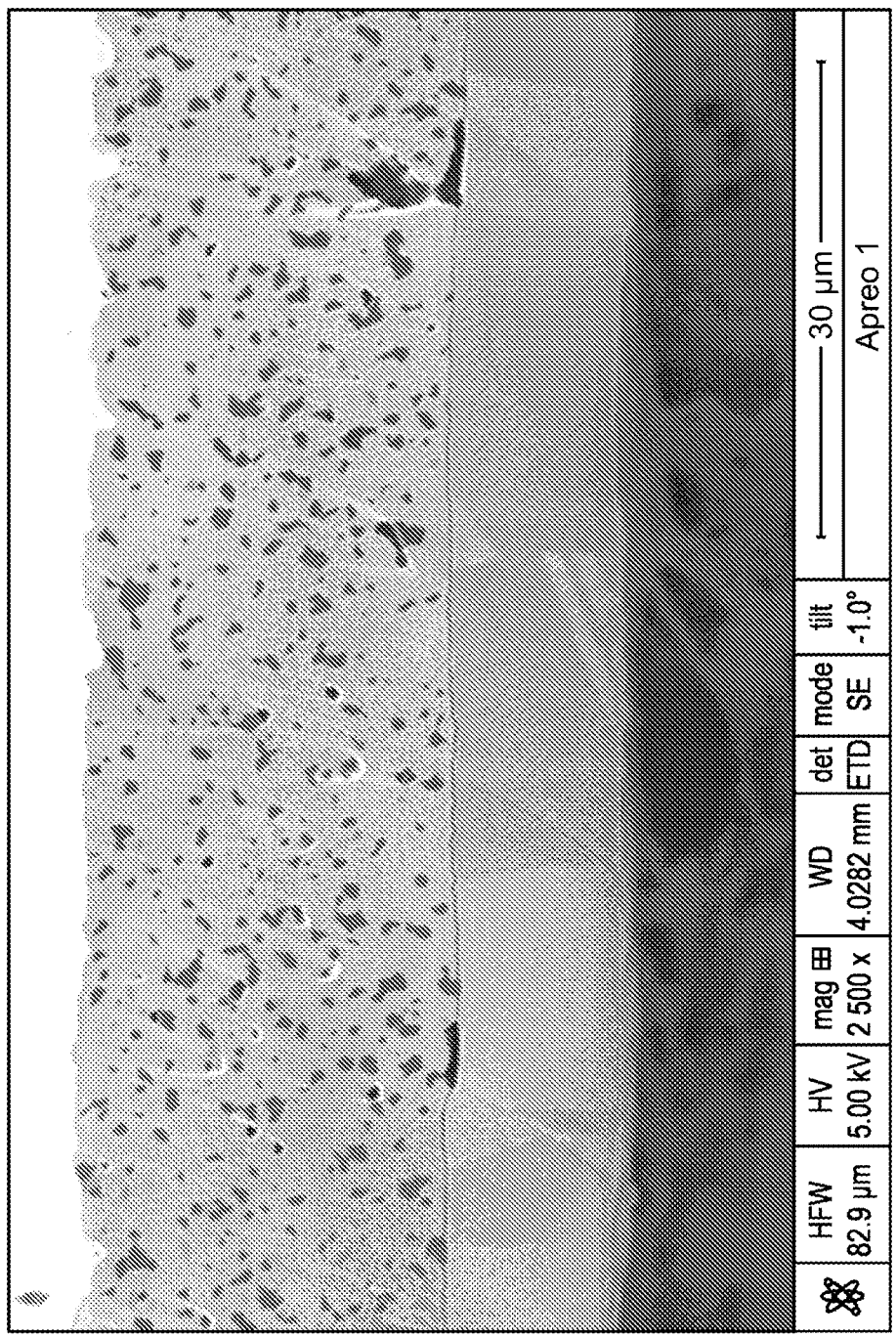
FIG. 17 shows an example of a film made according to an embodiment.

FIG. 17 shows a film made according to an embodiment, with a 10° C./min ramp rate until 1160° C., and a 5 minute dwell time at 1160° C. As shown in the figure, large pores in the film resulted, as well as formation of domains. This is likely due to a low ramp rate under these conditions.

In processes described herein, different tools may need different gas residence times. The gas residence times may be as short as 1 minute or as long as 20 minutes. In some cases, the gas residence times is from 2 minutes to 15 minutes, 4 minutes to 13 minutes, or 4 minutes to 10 minutes.

As ordinarily skilled artisans will appreciate, dwell times may be broken down n by seconds rather than minutes, and/or ramp rates may be broken down by fractions of a degree, to provide greater granularity in control.

The lower the dwell time, the greater the speed of the conveyor may be, depending on the embodiment. For a multi-region furnace, the longer each zone is, the faster the conveyor may move for a given dwell time, depending on the embodiment.

Depending on the embodiment, sintering may occur within a particular zone or zone of a furnace. Depending on the embodiment, sintering may occur within a portion of a particular zone of a furnace.

In different embodiments, a range of speeds at which the bilayer structures may be moved through the various zones of the furnace may be between 20 mm/min and 150 mm/min, depending on the length of the zones, the dwell time, and the ramp rate. In different embodiments, the bilayer structures may be moved through the various zones of the furnace at speeds between 25 mm/min and 145 mm/min. In different embodiments, the bilayer structures may be moved through the various zones of the furnace at speeds between 30 mm/min and 140 mm/min. In different embodiments, the bilayer structures may be moved through the various zones of the furnace at speeds between 35 mm/min and 135 mm/min. In different embodiments, the bilayer structures may be moved through the various zones of the furnace at speeds between 40 mm/min and 130 mm/min. In different embodiments, the bilayer structures may be moved through the various zones of the furnace at speeds between 45 mm/min and 125 mm/min. In different embodiments, the bilayer structures may be moved through the various zones of the furnace at speeds between 50 mm/min and 120 mm/min. In different embodiments, the bilayer structures may be moved through the various zones of the furnace at speeds between 60 mm/min and 110 mm/min. In different embodiments, the bilayer structures may be moved through the various zones of the furnace at speeds between 65 mm/min and 105 mm/min. In different embodiments, the bilayer structures may be moved through the various zones of the furnace at speeds between 70 mm/min and 100 mm/min. In different embodiments, the bilayer structures may be moved through the various zones of the furnace at speeds between 75 mm/min and 95 mm/min. In different embodiments, the bilayer structures may be moved through the various zones of the furnace at speeds between 70 mm/min and 90 mm/min. In different embodiments, the bilayer structures may be moved through the various zones of the furnace at speeds between 75 mm/min and 95 mm/min. In different embodiments, the bilayer structures may be moved through the various zones of the furnace at speeds between 80 mm/min and 90 mm/min.

In different embodiments, a range of speeds at which the bilayer structures may be moved through the various zones of the furnace may be between 20 mm/min and 100 mm/min, depending on the length of the zones, the dwell time, and the ramp rate. In different embodiments, the bilayer structures may be moved through the various zones of the furnace at speeds between 25 mm/min and 95 mm/min. In different embodiments, the bilayer structures may be moved through the various zones of the furnace at speeds between 30 mm/min and 90 mm/min. In different embodiments, the bilayer structures may be moved through the various zones of the furnace at speeds between 35 mm/min and 85 mm/min. In different embodiments, the bilayer structures may be moved through the various zones of the furnace at speeds between 40 mm/min and 80 mm/min. In different embodiments, the bilayer structures may be moved through the various zones of the furnace at speeds between 45 mm/min and 75 mm/min. In different embodiments, the bilayer structures may be moved through the various zones of the furnace at speeds between 50 mm/min and 70 mm/min. In different embodiments, the bilayer structures may be moved through the various zones of the furnace at speeds between 55 mm/min and 65 mm/min.

In different embodiments, the bilayer structures may be moved through the various zones of the furnace at speeds between 50 mm/min and 100 mm/min. In different embodiments, the bilayer structures may be moved through the various zones of the furnace at speeds between 55 mm/min and 95 mm/min. In different embodiments, the bilayer structures may be moved through the various zones of the furnace at speeds between 60 mm/min and 90 mm/min. In different embodiments, the bilayer structures may be moved through the various zones of the furnace at speeds between 65 mm/min and 85 mm/min. In different embodiments, the bilayer structures may be moved through the various zones of the furnace at speeds between 70 mm/min and 80 mm/min.

In different embodiments, the bilayer structures may be moved through the various zones of the furnace at speeds between 50 mm/min and 80 mm/min. In different embodiments, the bilayer structures may be moved through the various zones of the furnace at speeds between 55 mm/min and 75 mm/min. In different embodiments, the bilayer structures may be moved through the various zones of the furnace at speeds between 60 mm/min and 70 mm/min.

In different embodiments, the bilayer structures may be moved through the various zones of the furnace at speeds between 20 mm/min and 80 mm/min. In different embodiments, the bilayer structures may be moved through the various zones of the furnace at speeds between 25 mm/min and 75 mm/min. In different embodiments, the bilayer structures may be moved through the various zones of the furnace at speeds between 30 mm/min and 70 mm/min. In different embodiments, the bilayer structures may be moved through the various zones of the furnace at speeds between 35 mm/min and 65 mm/min. In different embodiments, the bilayer structures may be moved through the various zones of the furnace at speeds between 40 mm/min and 60 mm/min. In different embodiments, the bilayer structures may be moved through the various zones of the furnace at speeds between 45 mm/min and 55 mm/min.

In different embodiments, the bilayer structures may be moved through the various zones of the furnace at speeds between 20 mm/min and 30 mm/min. In different embodiments, the bilayer structures may be moved through the various zones of the furnace at speeds between 25 mm/min and 35 mm/min. In different embodiments, the bilayer structures may be moved through the various zones of the furnace at speeds between 30 mm/min and 40 mm/min. In different embodiments, the bilayer structures may be moved through the various zones of the furnace at speeds between 35 mm/min and 45 mm/min. In different embodiments, the bilayer structures may be moved through the various zones of the furnace at speeds between 40 mm/min and 50 mm/min. In different embodiments, the bilayer structures may be moved through the various zones of the furnace at speeds between 50 mm/min and 60 mm/min. In different embodiments, the bilayer structures may be moved through the various zones of the furnace at speeds between 55 mm/min and 65 mm/min. In different embodiments, the bilayer structures may be moved through the various zones of the furnace at speeds between 75 mm/min and 85 mm/min.

The apparatus, systems, and processes set forth herein are useful for making a variety of materials. These materials include but are not limited to lithium-stuffed garnet films. These materials include but are not limited to bilayers of a lithium-stuffed garnet film on a metal layer or trilayers of a metal layer between two lithium-stuffed garnet films. The apparatus, systems, and processes set forth herein are useful for making lithium-stuffed garnet films or composite materials, including but not limited to any of the sintered films or film-including materials set forth in PCT/US2016/043428, filed Jul. 21, 2016, and published as WO2017015511A1—titled PROCESSES AND MATERIALS FOR CASTING AND SINTERING GREEN GARNET THIN FILMS; PCT/US2019/056584, filed Oct. 16, 2019, and published as WO2020081718A1—titled SINTERING LARGE AREA CERAMIC FILMS; PCT/US2016/15209, filed Jan. 27, 2016, and published as WO2017131676A1—titled ANNEALED GARNET ELECTROLYTE SEPARATORS;

PCT/US2017/039069, filed Jan. 23, 2017, and published as WO2018236394A1—titled LITHIUM-STUFFED GARNET ELECTROLYTES WITH SECONDARY PHASE INCLUSIONS. PCT/US2019/54117, filed Oct. 1, 2019, and published as WO2020072524A1—titled METHODS $O_F$ MAKING AND USING AN ELECTROCHEMICAL CELL COMPRISING AN INTERLAYER; U.S. Pat. Nos. 10,403,931; 10,290,895; 9,966,630 B2; 10,347,937 B2; and 10,103,405, the entire contents of each of which are herein incorporated by reference in their entirety for all purposes.

In some examples, including any of the foregoing, the ceramic-metal film may be an oxide-metal film. In some examples, the film has one layer that is a ceramic and one layer that is a metal. In other examples, the film is a homogenous mixture of ceramic and metal. In some examples, the ceramic-metal film comprises a ceramic and a metal. In some examples, the volume percent of the ceramic is about 10% and the volume percent of the metal is about 90%. In some examples, the volume percent of the ceramic is about 20% and the volume percent of the metal is about 80%. In some examples, the volume percent of the ceramic is about 30% and the volume percent of the metal is about 70%. In some examples, the volume percent of the ceramic is about 40% and the volume percent of the metal is about 60%. In some examples, the volume percent of the ceramic is about 50% and the volume percent of the metal is about 50%. In some examples, the volume percent of the ceramic is about 60% and the volume percent of the metal is about 40%. In some examples, the volume percent of the ceramic is about 70% and the volume percent of the metal is about 30%. In some examples, the volume percent of the ceramic is about 80% and the volume percent of the metal is about 20%. In some examples, the volume percent of the ceramic is about 90% and the volume percent of the metal is about 10%. In some examples, the volume percent of the ceramic is about 5% and the volume percent of the metal is about 95%. In some examples, the volume percent of the ceramic is about 15% and the volume percent of the metal is about 85%. In some examples, the volume percent of the ceramic is about 25% and the volume percent of the metal is about 75%. In some examples, the volume percent of the ceramic is about 35% and the volume percent of the metal is about 65%. In some examples, the volume percent of the ceramic is about 45% and the volume percent of the metal is about 55%. In some examples, the volume percent of the ceramic is about 55% and the volume percent of the metal is about 45%. In some examples, the volume percent of the ceramic is about 65% and the volume percent of the metal is about 35%. In some examples, the volume percent of the ceramic is about 75% and the volume percent of the metal is about 25%. In some examples, the volume percent of the ceramic is about 85% and the volume percent of the metal is about 15%. In some examples, the volume percent of the ceramic is about 95% and the volume percent of the metal is about 5%.

In some examples, including any of the foregoing, the ceramic-metal film comprises an oxide and a metal. In some examples, the volume percent of the oxide is about 10% and the volume percent of the metal is about 90%. In some examples, the volume percent of the oxide is about 20% and the volume percent of the metal is about 80%. In some examples, the volume percent of the oxide is about 30% and the volume percent of the metal is about 70%. In some examples, the volume percent of the oxide is about 40% and the volume percent of the metal is about 60%. In some examples, the volume percent of the oxide is about 50% and the volume percent of the metal is about 50%. In some examples, the volume percent of the oxide is about 60% and the volume percent of the metal is about 40%. In some examples, the volume percent of the oxide is about 70% and the volume percent of the metal is about 30%. In some examples, the volume percent of the oxide is about 80% and the volume percent of the metal is about 20%. In some examples, the volume percent of the oxide is about 90% and the volume percent of the metal is about 10%. In some examples, the volume percent of the oxide is about 5% and the volume percent of the metal is about 95%. In some examples, the volume percent of the oxide is about 15% and the volume percent of the metal is about 85%. In some examples, the volume percent of the oxide is about 25% and the volume percent of the metal is about 75%. In some examples, the volume percent of the oxide is about 35% and the volume percent of the metal is about 65%. In some examples, the volume percent of the oxide is about 45% and the volume percent of the metal is about 55%. In some examples, the volume percent of the oxide is about 55% and the volume percent of the metal is about 45%. In some examples, the volume percent of the oxide is about 65% and the volume percent of the metal is about 32%. In some examples, the volume percent of the oxide is about 75% and the volume percent of the metal is about 25%. In some examples, the volume percent of the oxide is about 85% and the volume percent of the metal is about 15%. In some examples, the volume percent of the oxide is about 95% and the volume percent of the metal is about 5%.

In some examples, including any of the foregoing, the ceramic-metal film comprises a ceramic and a metal. In some examples, the weight percent of the ceramic is about 10% and the weight percent of the metal is about 90%. In some examples, the weight percent of the ceramic is about 20% and the weight percent of the metal is about 80%. In some examples, the weight percent of the ceramic is about 30% and the weight percent of the metal is about 70%. In some examples, the weight percent of the ceramic is about 40% and the weight percent of the metal is about 60%. In some examples, the weight percent of the ceramic is about 50% and the weight percent of the metal is about 50%. In some examples, the weight percent of the ceramic is about 60% and the weight percent of the metal is about 40%. In some examples, the weight percent of the ceramic is about 70% and the weight percent of the metal is about 30%. In some examples, the weight percent of the ceramic is about 80% and the weight percent of the metal is about 20%. In some examples, the weight percent of the ceramic is about 90% and the weight percent of the metal is about 10%. In some examples, the weight percent of the ceramic is about 5% and the weight percent of the metal is about 95%. In some examples, the weight percent of the ceramic is about 15% and the weight percent of the metal is about 85%. In some examples, the weight percent of the ceramic is about 25% and the weight percent of the metal is about 75%. In some examples, the weight percent of the ceramic is about 35% and the weight percent of the metal is about 65%. In some examples, the weight percent of the ceramic is about 45% and the weight percent of the metal is about 55%. In some examples, the weight percent of the ceramic is about 55% and the weight percent of the metal is about 45%. In some examples, the weight percent of the ceramic is about 65% and the weight percent of the metal is about 35%. In some examples, the weight percent of the ceramic is about 75% and the weight percent of the metal is about 25%. In some examples, the weight percent of the ceramic is about 85% and the weight percent of the metal is about 15%. In some examples, the weight percent of the ceramic is about 95% and the weight percent of the metal is about 5%.

In some examples, including any of the foregoing, the ceramic in the ceramic-metal film may be selected from alumina, silica, titania, lithium-stuffed garnet, lithium aluminate, aluminum hydroxide, an aluminosilicate, lithium zirconate, lanthanum aluminate, lanthanum zirconate, lanthanum oxide, lithium lanthanum oxide, zirconia, $Li_2ZrO_3$, $xLi_2O$-$(1-x)SiO_2$ (where $x=0.01$-$0.99$), $aLi_2O$-$bB_2O_3$-$cSiO_2$ (where $a+b+c=1$), $LiLaO_2$, $LiAlO_2$, $Li_2O$, $Li_3PO_4$, or combinations thereof.

In examples, the trilayer includes a metal foil and a green ceramic film on both sides of the metal foil. A metal foil in a bilayer or trilayer may have a thickness of between 0.5 µm to 50 µm. A metal foil in a bilayer or trilayer may have a thickness of between 3 µm to 30 µm. In some examples, the metal foil in a bilayer or trilayer may have a thickness of between 5-20 µm. In other examples, the metal foil in a bilayer or trilayer may have a thickness of between 5 µm to 15 µm.

Figure 19:
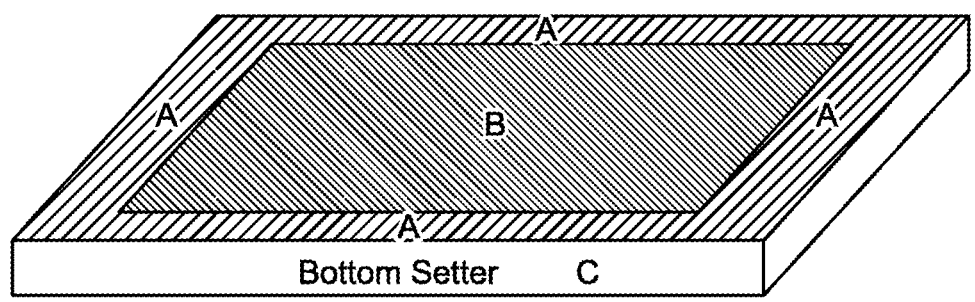
FIG. 19 shows an embodiment of a setter stack disclosed herein.

FIG. 19 shows an embodiment in which a bilayer (B) is sandwiched between a center-less cover (A) and a bottom setter (C). In some embodiments, the center-less cover (A) is a top setter. In some embodiments, the center-less cover (A) is a foam material. In some embodiments, including any of the foregoing, the bilayer (B) includes one layer comprising a metal and a second layer comprising a green film or a sintered film. In some embodiments, the sintered film of the bilayer (B) is a lithium-stuffed garnet sintered film. In some embodiments, including any of the foregoing, the layer comprising a metal of the bilayer (B) further comprises lithium-stuffed garnet. In some embodiments, including any of the foregoing, the layer comprising a metal comprises Nickel (Ni). In some embodiments, including any of the foregoing, the layer comprising a metal comprises Copper (Cu). In some embodiments, including any of the foregoing, the layer comprising a metal comprises iron (Fe). In some embodiments, including any of the foregoing, the foam material is a metal foam. In some embodiments, including any of the foregoing, the foam material is a porous nickel foam.

EXAMPLES

Reagents, chemicals, and materials were commercially purchased unless specified otherwise to the contrary.

Pouch cell containers were purchased from Showa Denko.

The Electrochemical potentiostat used was an Arbin potentiostat.

Electrical impedance spectroscopy (EIS) was performed with a Biologic VMP3, VSP, VSP-300, SP-150, or SP-200.

Scanning Electron Microscopy (SEM) was performed in a FEI Quanta SEM, an Apreo SEM, a Helios 600i, or a Helios 660 FIB-SEM. (FIB stands for Focused Ion Beam.)

Transmission Electron Microscopy (TEM) was performed as follows.

Sample preparation: The samples for TEM measurements were prepared using Ga ion sourced focused ion beam SEM (nanoDUET NB5000, from Hitachi High Technologies). To protect the surface of material from the Ga ion beam, multiple protective layers were deposited in advance of the sampling; first, metal layer was deposited by a plasma coater and then a carbon protective layer and a tungsten layer were deposited by high vacuum evaporation and a focused ion beam, respectively. The thin slice sampling was conducted by a focused ion beam. The prepared sample was measured in a transmission electron microscope.

X-ray powder diffraction (XRD) was performed in a Bruker D8 Advance A25 with Cu K-α radiation at room temperature (e.g., between 21° C. and 23° C.). The source was Cu-Ka, and the wavelength was 1.54 Å. The X-ray is at 40. kV and 25 mA. The detector was a Bruker LYNXEYE XE with a position sensitive detector (PSD) opening of 2.843. A divergence slit was at 0.6 mm and antiscatter was at 5.0 mm fixed.

Milling was performed using a Retsch PM 400 Planetary Ball Mill. Mixing was performed using a Fisher Scientific vortex mixer, a Flaktek speed mixer, or a Primix filmix homogenizer.

Casting was performed on a TQC drawdown table. Calendering was performed on an Innovative Machines Corporation (IMC) calender.

Figure 9:
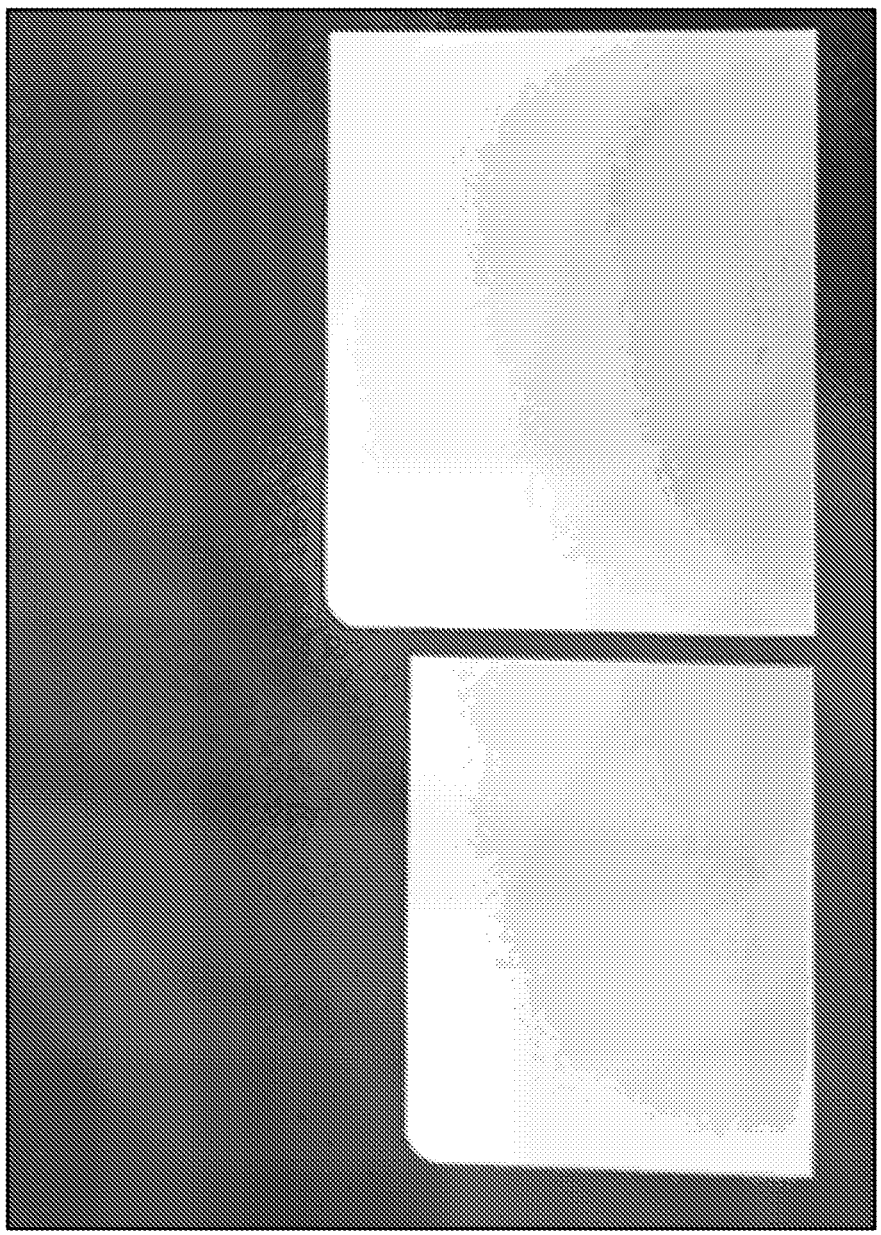
FIG. 9 shows two films made according to an embodiment.

FIG. 9 shows two films made according to embodiments. The film on the left has dimensions of approximately 60 mm×75 mm. The film on the right has dimensions of approximately 75 mm×90 mm.

Example 1—RTP Process

The green tape cast on metal foil was unrolled and cut to the appropriate dimensions for sintering. This was done using a laser cutter, but in different iterations it may also be cut using a blade blanking tool. Discrete green sheets were then stacked between setter components and placed on the bottom graphite heating plate that is part of the sintering apparatus, with the top graphite heating plate in close proximity above. In this case, setter components refer to a dense $Al_2O_3$ plate onto which the green sheet was placed coating side up, followed by a ceramic or metal frame component, followed by another dense $Al_2O_3$ plate.

The stack was heated to 800° C. at a ramp rate of 50° C./min (range: 50° C./min-100° C./min) and held there for 5 min. The gas flow was 2.0 LPM (liters per minute) of mostly argon gas. Following organic removal, the stack was subsequently heated for sintering to 1100° C. at a ramp rate of 100° C./min (range: 100° C./min-300° C./min) and held there for 30 seconds. The graphite plates were then cooled to room temperature at 100° C./min (range: 100° C./min-300° C./min). Upon reaching room temperature, the sinter stacks were removed from the furnace and disassembled.

Example 2—Two-Step Process (RTP Tool Followed by Lamp Tool)

The green tape cast on metal foil, as discussed above, was unrolled and cut to the appropriate dimensions for sintering. This was done using a laser cutter, but in different iterations it may also be cut using a blade blanking tool. A discrete green sheet was then stacked between setter components and placed on the bottom graphite heating plate that is part of the debindering apparatus, with the top graphite heating plate in close proximity above. In this case, setter components refer to a dense $Al_2O_3$ plate onto which the green sheet was placed coating side up, followed by a ceramic or metal frame component, followed by another dense $Al_2O_3$ plate.

To remove organic material from the green layer, the graphite plates were heated to 800° C. at a ramp rate of 50° C./min (range: 50° C./min-100° C./min) and held there for 5 min. The graphite plates were then cooled to room temperature at 100° C./min (range: 100° C./min-300° C./min). Upon reaching room temperature, the sinter stack was removed from the graphite plates and moved to the lamp heating system for sintering, where it was placed on a graphite susceptor.

In the lamp heating system, the gas flow was 0.25 LPM (liters per minute) mostly argon gas. For sintering, the graphite susceptor containing the sinter stack was heated to 1120° C. (range: 1080° C.-1120° C.) at a ramp rate of 300° C./min and held there for 30 seconds (range: 30 seconds-2 minutes). Upon reaching room temperature, the sinter stack was removed from the heating system and disassembled.

Example 3—Vacuum Furnace Tool

The green tape cast on metal foil, as discussed above, was unrolled and cut to the appropriate dimensions for sintering. This was done using a laser cutter, but in different iterations it may also be cut using a blade blanking tool. Discrete green sheets were then stacked between setter components and placed on the support furniture used with the sintering apparatus. In this case, setter components refer to a dense $Al_2O_3$ plate onto which the green sheet was placed coating side up, followed by a ceramic or metal frame component, followed by a metal sheet onto which a $LiAlO_2$ coating has been applied, followed by another dense $Al_2O_3$ plate.

Figure 18:
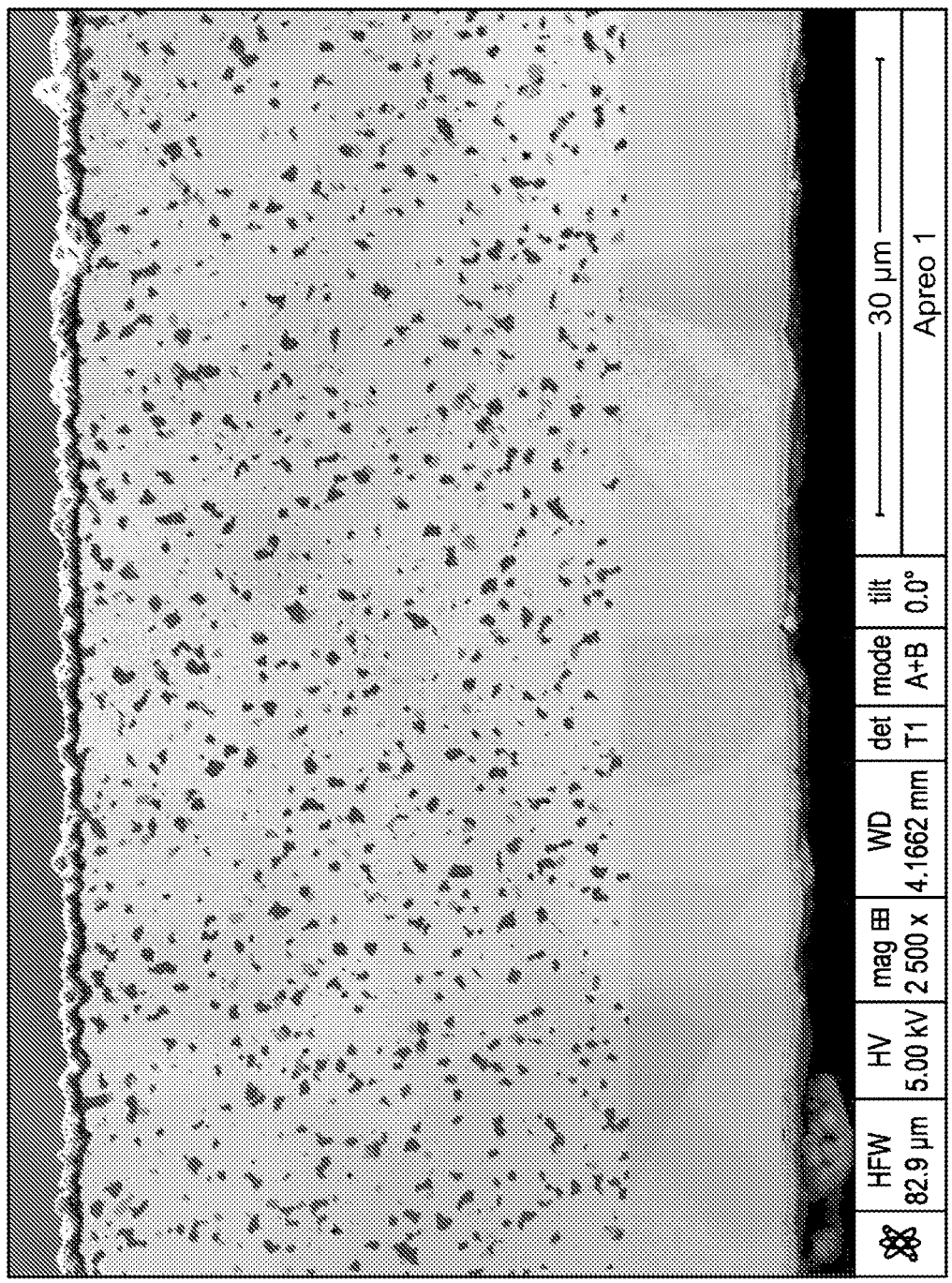
FIG. 18 shows an example of a film made according to an embodiment.

The prepared sinter stacks, comprising support furniture, setter components, and discrete green sheet, were placed inside the vacuum furnace. To remove organic material from the green layer, the furnace was heated at atmospheric pressure to 780° C. (range: 760° C. to 840° C.) at a ramp rate of 30° C./min (range: 10° C./min to 30° C./min) and held there for 15 min. The gas flow was 5.0 LPM (liters per minute) (range: 5 LPM-13 LPM) mostly nitrogen gas. Following organic removal, the furnace was subsequently heated for sintering to about 1200° C. at a ramp rate of 50° C./min and held there for 1 min. The furnace was then cooled to room temperature. Upon reaching room temperature, the sinter stacks were removed from the furnace and disassembled. A cross-section of the resulting film is shown in FIG. 18.

Example 4—Vacuum Furnace Process Under Partial Vacuum

The green tape cast on metal foil, as discussed above, was unrolled and cut to the appropriate dimensions for sintering. This was done using a laser cutter, but in different iterations it may also be cut using a blade blanking tool. Discrete green sheets were then stacked between setter components and placed on the support furniture used with the sintering apparatus. In this case, setter components refer to a dense $Al_2O_3$ plate onto which the green sheet was placed coating side up, followed by a ceramic or metal frame component, followed by a metal sheet onto which a $LiAlO_2$ coating has been applied, followed by another dense $Al_2O_3$ plate.

The prepared sinter stacks, comprising support furniture, setter components, and discrete green sheet, inside the vacuum furnace. To remove organic material from the green layer, the furnace was heated at atmospheric pressure to about 800° C. and held there for 15 min. The gas flow was 5.0 LPM (liters per minute) mostly nitrogen gas. Following organic removal, the furnace was cooled to room temperature. Upon reaching room temperature, a partial vacuum was created inside the furnace by pumping with a dry vacuum pump that has a pumping speed of around 15 m³/hr, while flowing 5.0 LPM nitrogen, resulting in a pressure of 14 Torr. Maintaining this condition throughout, the furnace was heated for sintering to about 1150° C. at a ramp rate of 50° C./min and held there for 1 min. The furnace was then cooled to room temperature. Upon reaching room temperature, the pumping was stopped, the furnace was vented to atmospheric pressure with nitrogen and the sinter stacks were removed from the furnace and disassembled.

Example 5

The prepared sinter stacks, comprising support furniture, setter components, and discrete green sheet, were loaded onto the conveyor of a RHK (roller hearth kiln). The thermal profile of the RHK was specified to perform two processes. To remove organic material from the green layer, the sinter stacks were heated to 800° C. at an effective ramp rate of 24° C./min and held there for 15 min. Following organic removal, the sinter stacks were subsequently heated for sintering to 1150° C. at an effective ramp rate of 24° C./min and held there for 7 min. The sinter stack was then cooled to room temperature. Upon exiting the RHK, the sinter stacks were removed from the conveyor and disassembled. The sintered films were then cut to the appropriate size for battery cell construction using a laser cutter. The resulting films were made into battery cells used for electrical testing, shown in FIGS. 10 and 11.

Figure 10:
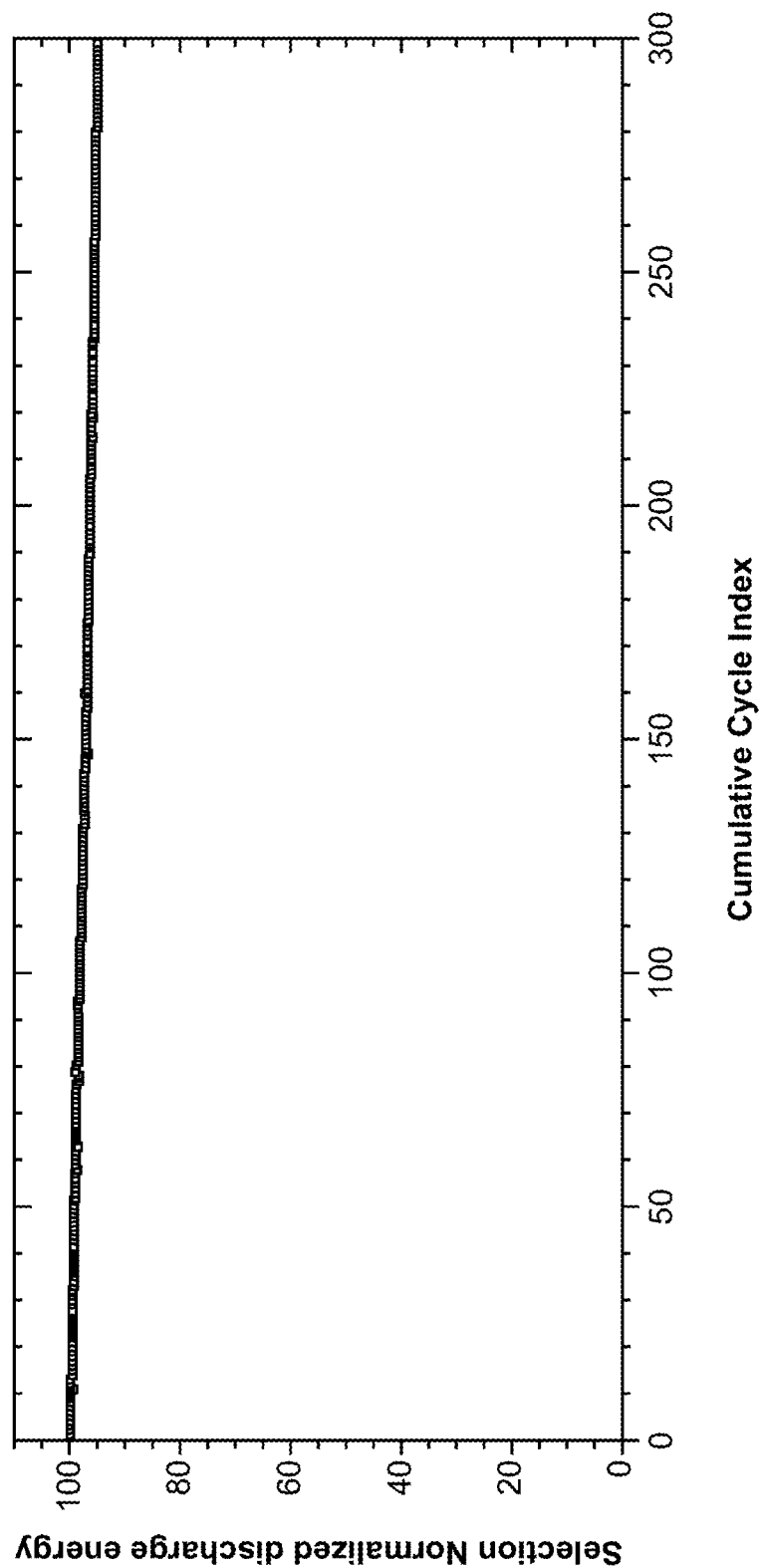
FIG. 10 shows the cycling data of a two-layer battery comprising a film made according to an embodiment.

A battery was assembled with two bilayers with NMC active material. The bilayer films had a thickness of 35 um, a width of 60 mm, and a length of 75 mm. The cathode was infiltrated by a liquid catholyte containing a lithium salt and a solvent to dissolve the salt. The cell was cycled at a rate of 1.35 C charge rate, 1 C discharge rate, at 25° C., 1 atm pressure. As FIG. 10 shows, the cell retained more than 90% of its initial capacity after 300 cycles of 100% depth-of-discharge.

Example 6

Figure 11:
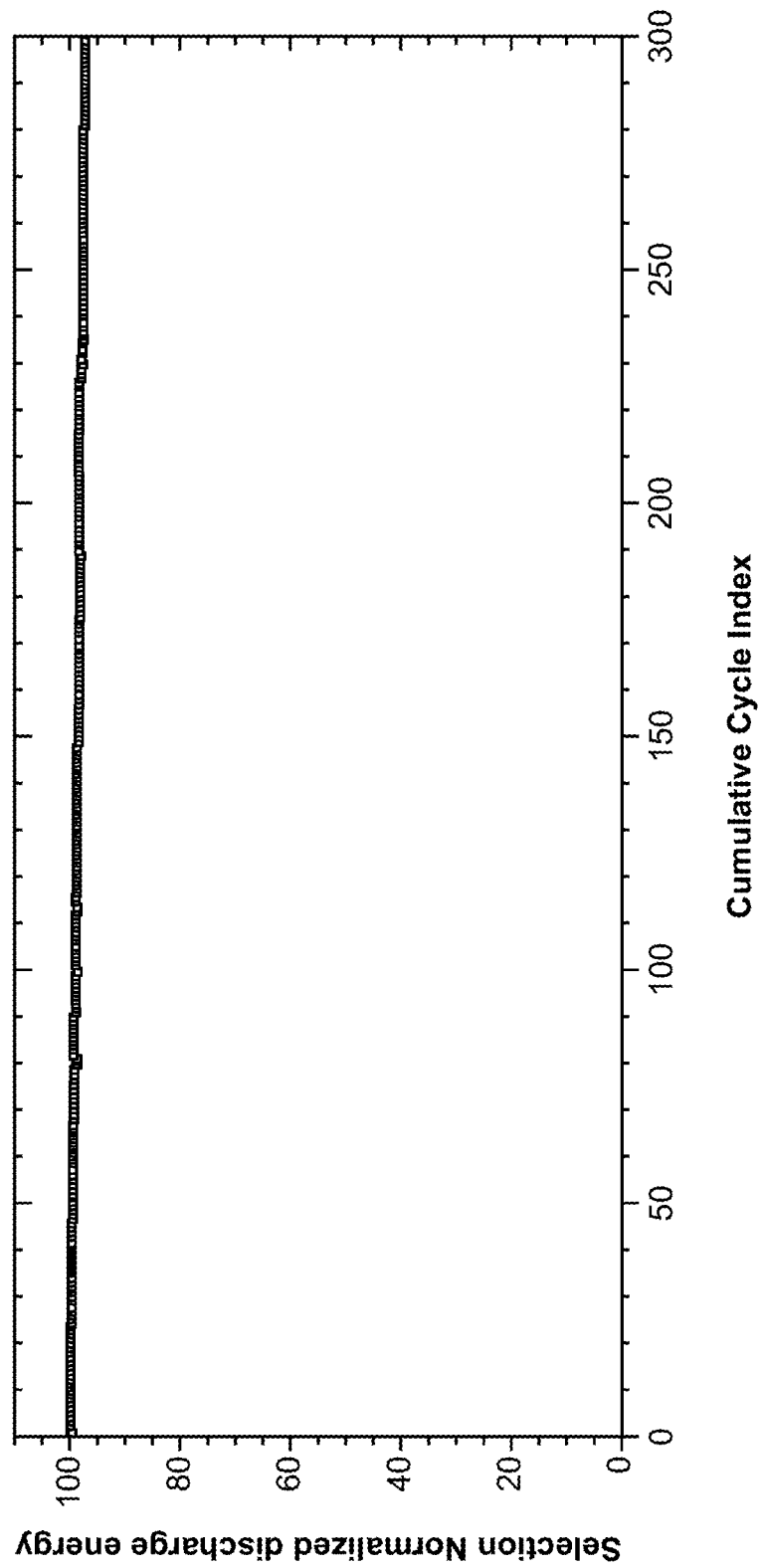
FIG. 11 shows the cycling data of a multi-layer battery comprising a film made according to an embodiment.

A battery was assembled with six bilayers with NMC active material. The bilayer films had a thickness of 35 um, a width of 60 mm, and a length of 75 mm. The cathode was infiltrated by a liquid catholyte containing a lithium salt and a solvent to dissolve the salt. The cell was cycled at a rate of 1 C charge rate, 1 C discharge rate, at 25° C., 1.5 atm pressure. As FIG. 11 shows, the cell retained more than 95% of its initial capacity after 300 cycles of 100% depth-of-discharge.

Example 7

The green tape cast on metal foil, as discussed above, was unrolled and cut to the appropriate dimensions for sintering. This was done using a blade blanking tool, but in different iterations it may also be cut using a laser cutter. Discrete green sheets were then stacked between setter components and placed on the support furniture used with the sintering apparatus. In this case, setter components refer to a dense $Al_2O_3$ plate onto which the green sheet was placed coating side up, followed by a ceramic or metal frame component, followed by another dense $Al_2O_3$ plate onto which a $LiAlO_2$ coating has been applied.

Example 8

The prepared sinter stacks, comprising support furniture, setter components, and discrete green sheet, were placed inside a three inch tube furnace. To remove organic material from the green layer, the furnace was heated to 800° C. at a ramp rate of 10° C./min and held there for 15 min. The gas flow was 0.25 LPM (liters per minute) mostly nitrogen gas. Following organic removal, the furnace was subsequently heated for sintering to 1150° C. at a ramp rate of 10° C./min and held there for 5 min. The furnace was then cooled to room temperature at 10° C./min until the furnaces natural cooling rate was reached. Upon reaching room temperature, the sinter stacks were removed from the furnace and disassembled. Film imaging for domain observation was performed using an optical microscope under coaxial lighting conditions.

Figure 13:
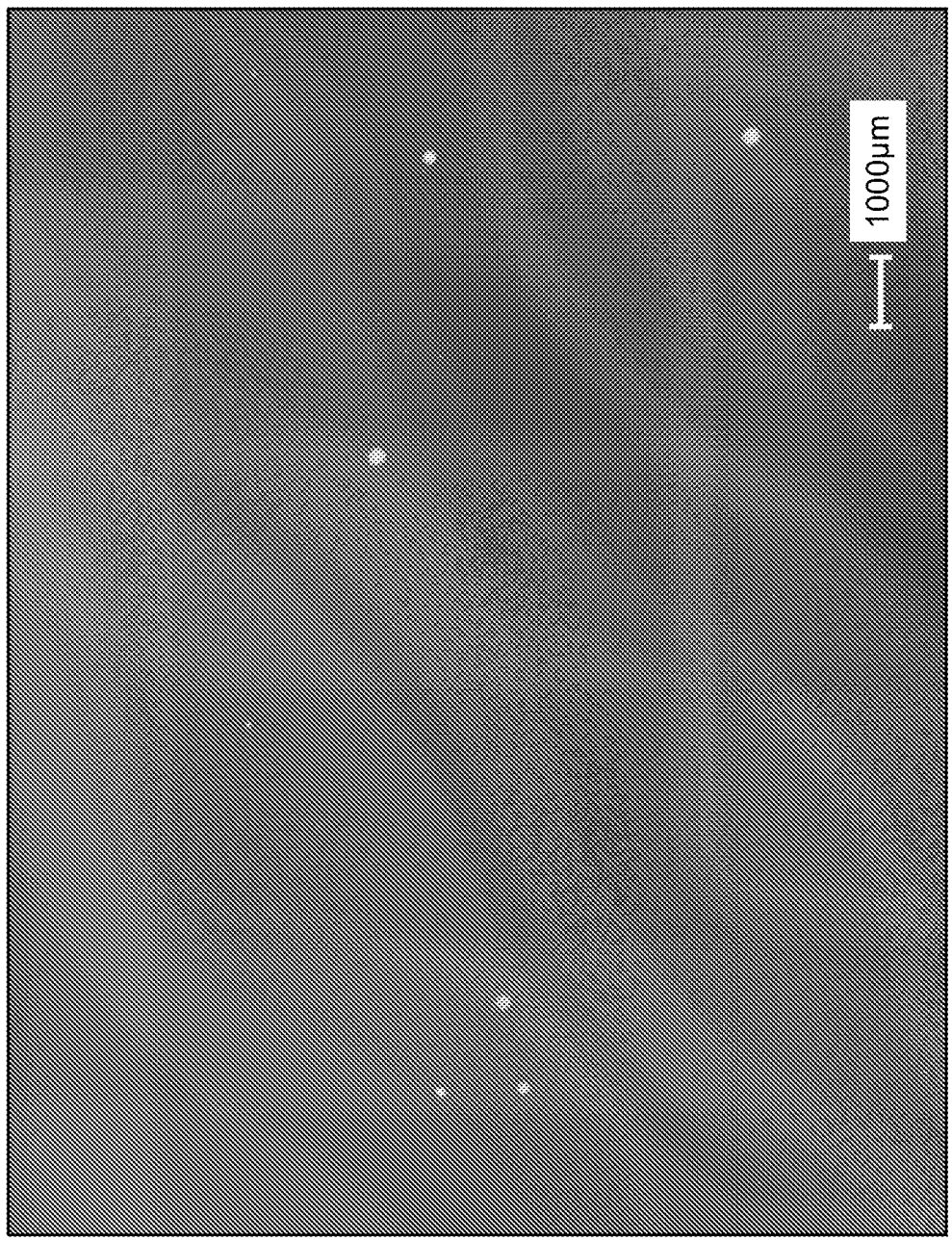
FIG. 13 shows a film made according to an embodiment.

FIG. 13, which is a micrograph of the film, shows domains in the film, wherein the domains are large grains, shown as white spots in FIG. 13 are the domains. In this example, the film was sintered at a temperature that was too high and a dwell time of this film that was too long, resulting in the domain formation.

Example 9

Figure 12:
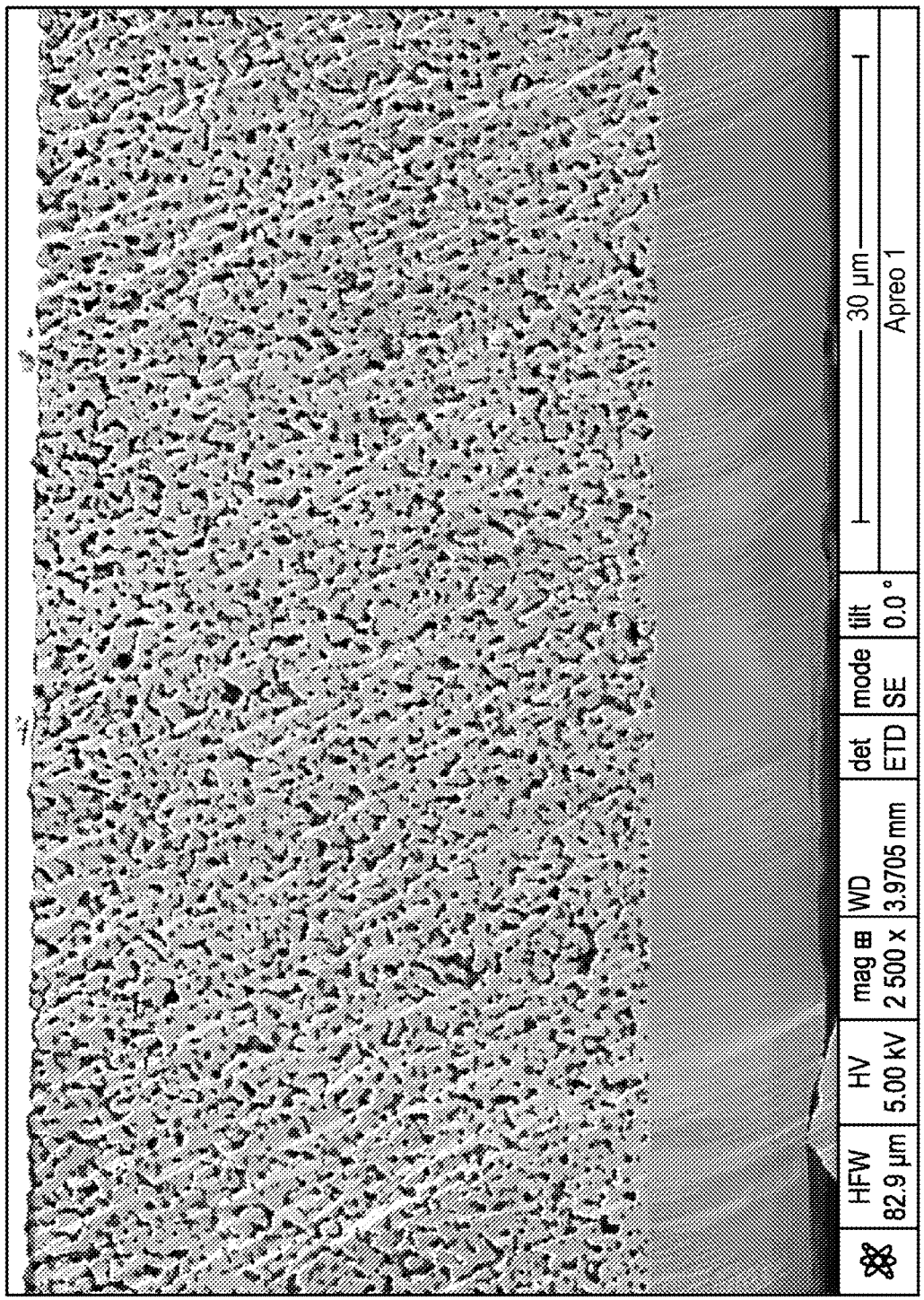
FIG. 12 shows a film made according to an embodiment.

A film was made with a 50° C./min ramp rate until 1100° C., and a 1 minute dwell at maximum temperature (i.e. 1100° C.). FIG. 12, which is a micrograph of the resulting film, shows pores in the film. In this example, the film was sintered at a temperature that was too low and a dwell time that was too short. As ordinarily skilled artisans will appreciate, there is a direct correlation between the length of dwell time and the maximum temperature of sintering. That is, an increase in one variable will directly have an impact on the other variable.

Example 10

Figure 14:
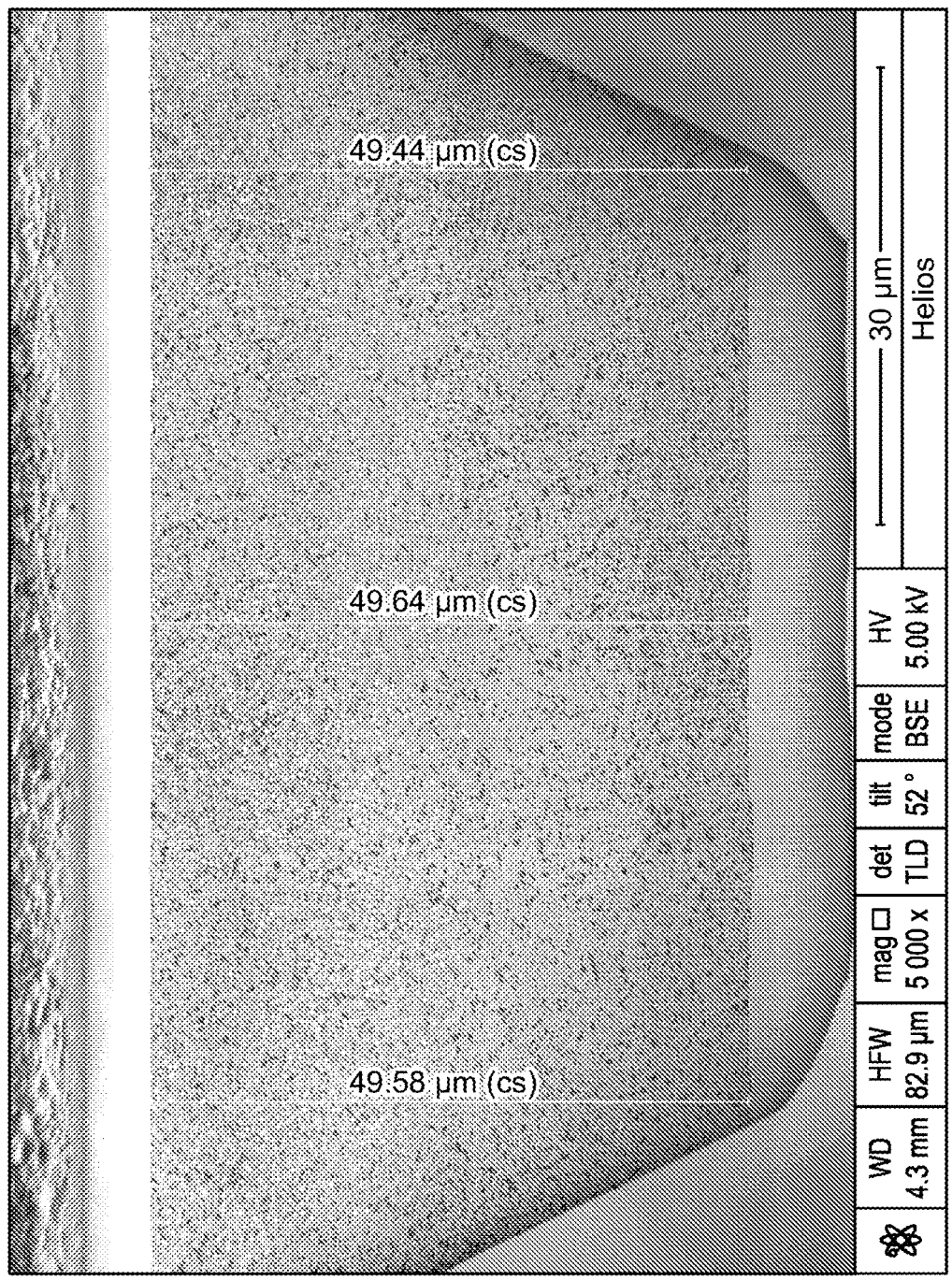
FIG. 14 shows a cross-section of a green film before a heat treatment according to an embodiment.

FIG. 14 shows a cross-section of a green film before a heat treatment according to an embodiment. The thickness of the green film is approximately 50 um.

Figure 15:
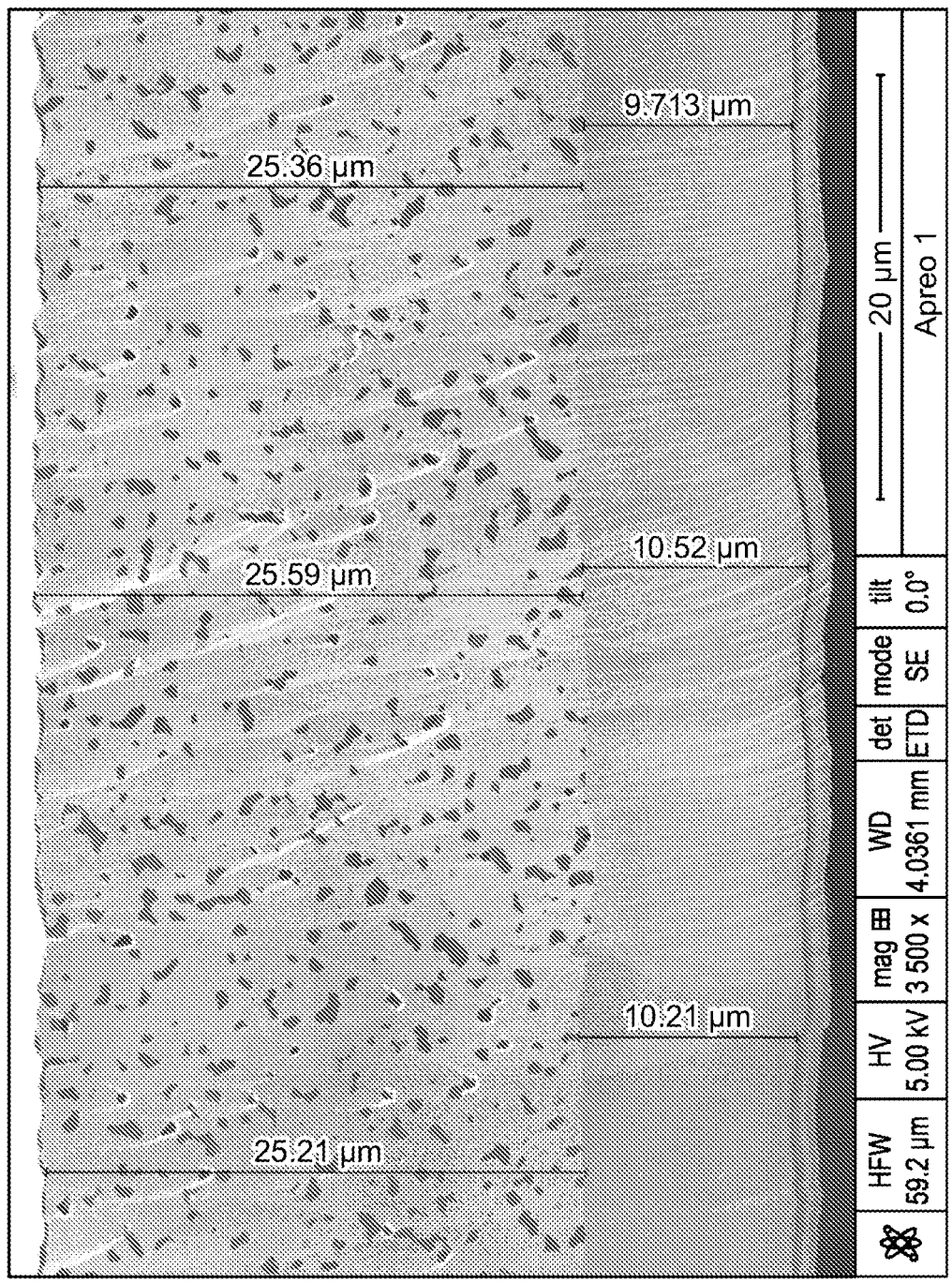
FIG. 15 shows a cross-section of the green film of FIG. 14 after a heat treatment process described herein.

FIG. 15 shows a cross-section of the green film of FIG. 14 after a heat treatment process described herein. The thickness of the sintered film is approximately 25 um.

Prophetic Examples—Making a Sintered Solid-State Electrolyte

In the following prophetic examples, a slurry is made by mixing lithium stuffed garnet, a solvent, a binder, and a plasticizer.

Prophetic example 1 (slurry one): LLZO powders were dispersed in ethanol with 2 wt % polyacrylic acid, using an ultrasonic horn. Larger particles were allowed to settle. The supernatant was decanted and the recovered powder dried in air. The collected powder, polyvinyl butyral, benzyl butyl phthalate, acetone, and ethanol at weight ratios 37:3:3:29:29 were added to a vial and ball-milled with 2.0 mm diameter $ZrO_2$ beads for 10-24 h. The slurry was cast using a doctor blade onto a mylar substrate; film thicknesses were controlled by adjusting the blade height. Dried green films were manually peeled off the Mylar substrate and cut to the desired size.

Prophetic example 2 (slurry two): LLZO powders with 3 wt % polyacrylic acid were dispersed in ethanol. A second solution of polyvinyl butyral, benzyl butyl phthalate, and acetone was mixed in weight ratios of 1:1:10. The second solution and first solution were mixed in equal parts by volume. The resulting slurry was milled with $ZrO_2$ beads for 8-16 hours. The slurry was cast using a doctor blade onto a mylar substrate at a thickness controlled by the doctor blade height. After drying in air, the films were manually peeled from the substrate and cut to size.

Prophetic example 3 (slurry three): An aqueous polymer solution was prepared by dissolving methylcellulose, polyethylene glycol and glycerol in water. The component weight ratios are water:(methyl cellulose):(polyethylene glycol):glycerol=100:1:4:4. LLZO powder was added to the polymer solution at equal weight to the solution. The slurry was mixed with $ZrO_2$ beads for 5-60 min. The slurry was cast on mylar foil with a doctor blade; the thickness was controlled by the doctor blade gap. After drying in air, the tapes were peeled from the mylar substrate and cut to size.

Prophetic example 4 (slurry four): LLZO was ball milled in a mixture of equal parts of ethanol, xylene, toluene. Menhaden fish oil at 2-5 wt % relative to LLZO was added dropwise for 30 min. Polyvinyl butyral at 6-10 wt % relative to LLZO, polyethylene glycol at 2-4 wt % relative to LLZO and benzyl butyl phthalate at 3-7 wt % relative to LLZO were added and mixed. Tapes were cast on mylar substrate with a doctor blade. After drying at 45° C. for 1-6 hours, the tape was released from mylar and cut to size.

Prophetic example 5 (slurry five): A slurry was prepared by mixing 100 g LLZO powder, 2-4 g of glyceryl trioleate, 100-200 g of n-propyl propionate, 15-25 g of elvacite E-2046 and ball milling. The slurry was cast by a doctor blade onto a substrate, dried, and released from the substrate.

Prophetic example 6 (slurry six): A slurry was prepared by mixing 20 g LLZO powder, 25-40 g of a solvent mixture (ethanol:butanol:(propylene glycol) in volume percentages within the ranges 70-80:15-25:0-5), 1-3 g of dibutyl phthalate, 1-4 g of PVB, and 0.1-1 g of dispersant in a mill. The dispersant may be a dispersant such as Anti-terra-202 from BYK. After mixing, the slurry was filtered, deaerated, and cast by reverse comma coating onto a substrate. The green tape was dried, released from the substrate, and cut to size.

Prophetic example 7 (slurry seven): A slurry was made by mixing water (30 parts by mass), LLZO powder (12-18 parts by mass) a binder solution (WB4101, WB40B-44, WB40B-53 from Polymer Innovations at 8 parts by mass) for at least one hour in a mill. After mixing, the slurry was filtered, deaerated, and cast by slot die coating onto a substrate. The green tape was dried, released from the substrate, and cut to size.

Prophetic example 8 (slurry eight): LLZO powder was milled in a mixed solvent of toluene and isopropanol plus fish oil. The mixture was mixed for 1-5 hours to prepare a slurry. A binder solution of toluene and isopropanol plus polyvinyl butyral, and butyl benzyl phthalate was mixed. The binder solution was added to the slurry and mixed. The mixture was deaerated, filtered, and cast onto a polymer carrier. The green tape was dried and blanked into sheets of 10-40 cm length. The blanks were released from the carrier and subsequently cut to size.

Prophetic example 9 (slurry nine): A slurry of calcined LLZO was prepared by mixing 80 g of calcined LLZO powder with 50 ml of a 33% w/w solution of polyvinyl butyral in toluene and 4 g of plasticizer di-butyl Phthalate. A polyacrylic binder was included at 3 weight percent of the solution. The slurry was tape casted onto a silicone-coated mylar substrate using a doctor blade. The cast mixed slurry was allowed to dry at room temperature for 2-6 hours to form a green film. The green film was blanked into sheets of 10-40 cm length. The blanks were released from the carrier and cut to size.

In different iterations, as discussed above, the slurry may be cast onto metal foil such as Ni foil. In different iterations, as discussed above, the slurry may be cast onto an alloy foil, such as combinations of nickel, copper, and iron. In different iterations, as discussed above, a slurry may be cast onto a nickel and iron alloy foil. In iterations where the slurry is cast onto metal foil and dried to form a tape (green bilayer), the green tape layer may or may not be released from the metal substrate. The slurry on foil is then placed into the apparatus and sintered.

Figure 4A:
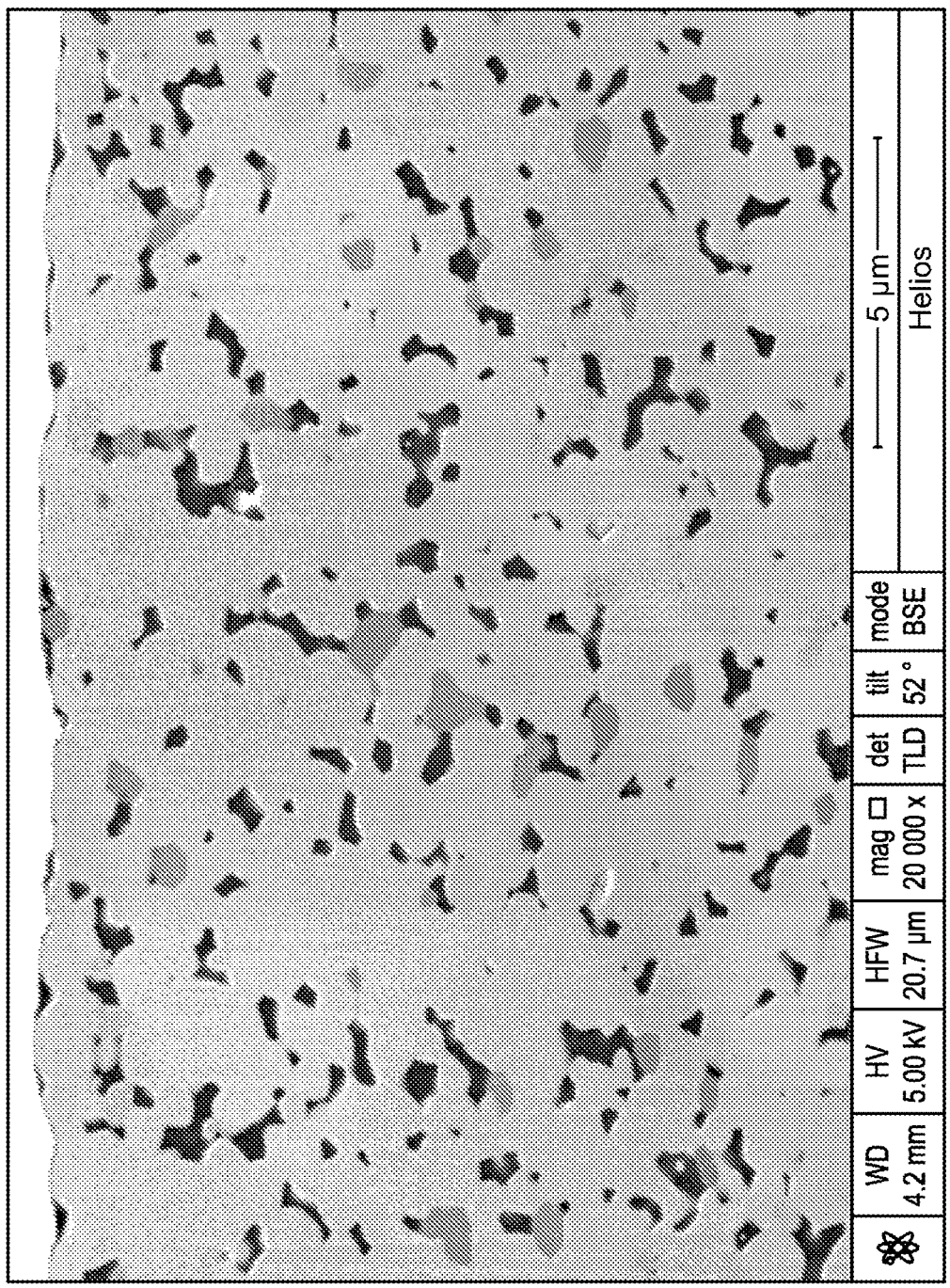
FIGS. 4A-4C show films produced according to embodiments.
Figure 4B:
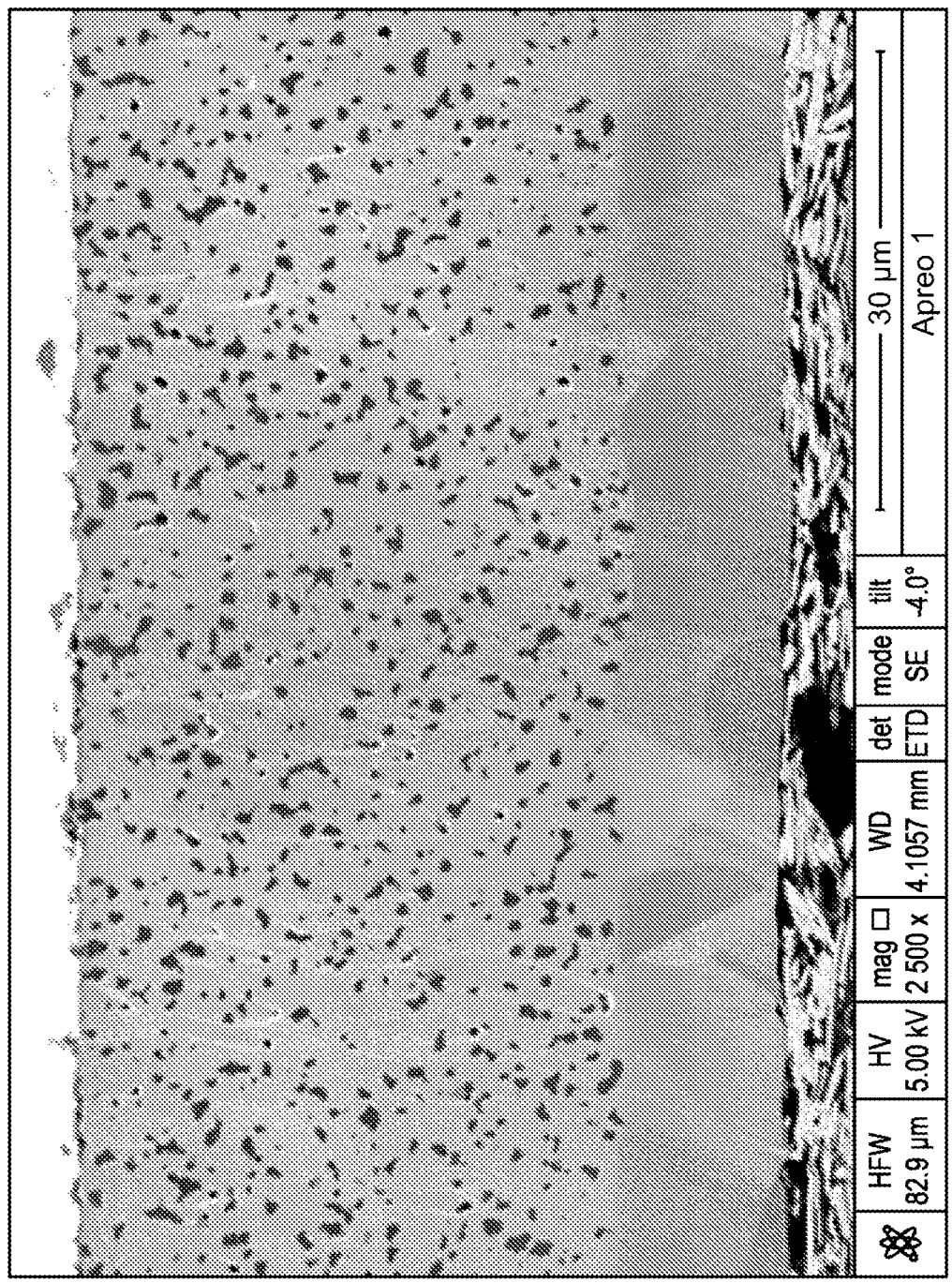
Figure 4C:
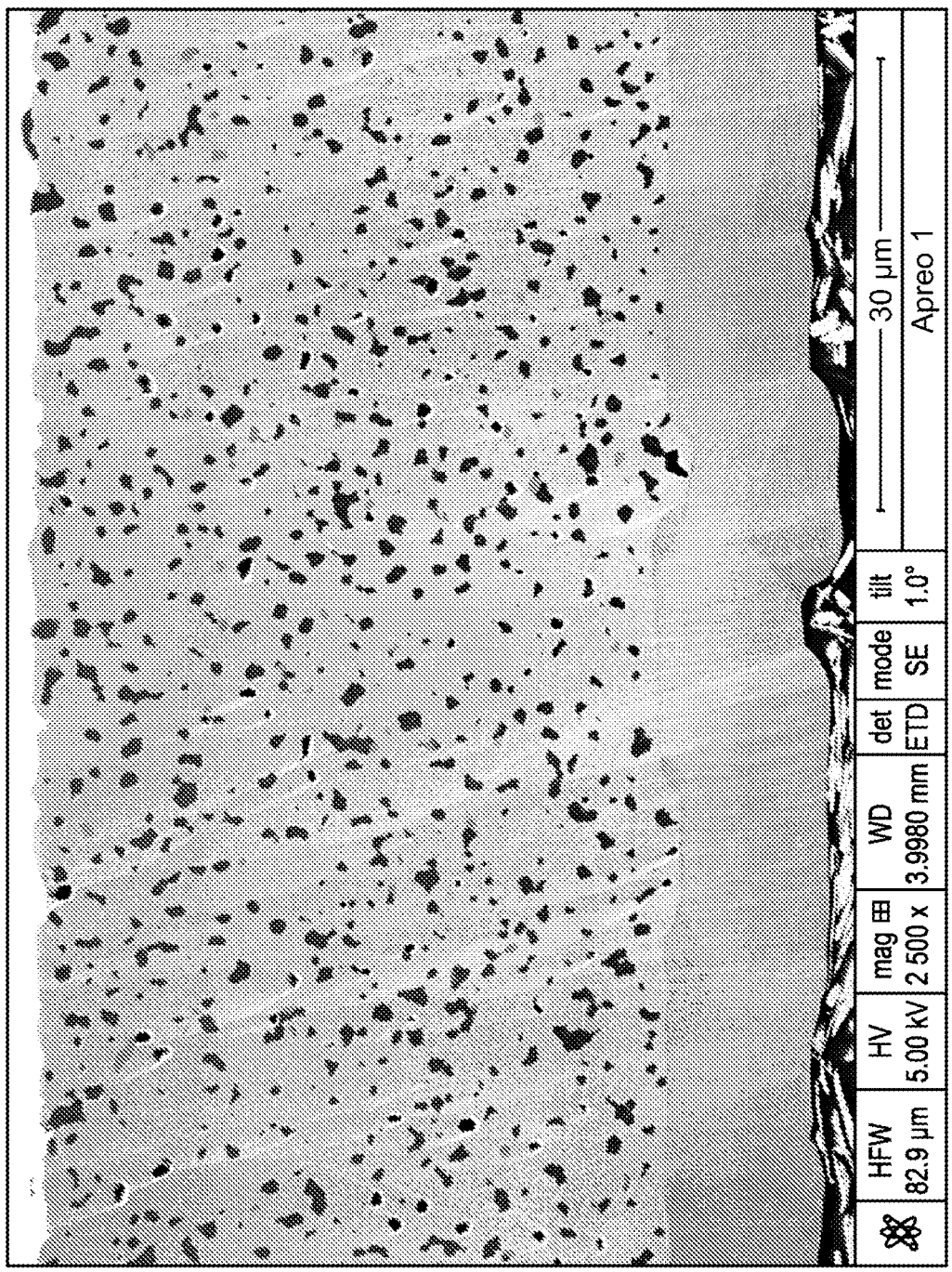

After drying, the dried slurry is sintered in the apparatus shown in FIG. 3. In some examples, debindering is performed in the apparatus. In some examples, debindering is performed outside of the apparatus. In some examples, films were sintered on a susceptor in an apparatus such as the one shown in FIG. 3. In some examples, films were sintered directly on the susceptor such as the one in the apparatus of FIG. 3. In some examples, films were sintered using furniture and frame structures such as those shown in FIGS. 6A-6C and 7A-7B, and in apparatus such as those shown in FIGS. 5 and 8. FIGS. 4A-C show sintered samples.

The embodiments and examples described above are intended to be merely illustrative and non-limiting. Ordinarily skilled artisans will recognize, or will be able to ascertain using no more than routine experimentation, numerous equivalents of specific compounds, materials and procedures. All such equivalents are considered to be within the scope and are encompassed by the appended claims.

What is claimed is:

1. A process for sintering, the process comprising:
providing a stack comprising a bilayer, furniture, and a frame;
wherein the bilayer comprises a green body layer disposed on a metal layer;
wherein the furniture comprises a first plate that contacts the metal layer of the bilayer and a second plate disposed above the green body layer of the bilayer;
wherein the frame is interposed between the green body layer and the second plate;
moving the stack through a furnace at about 1050° C. to about 1250° C. for about 30 seconds to about 3 minutes;
thereby providing a sintered bilayer comprising a lithium-stuffed garnet layer on the metal layer;
wherein the sintered bilayer has a thickness of between about 10 µm and about 50 µm.

2. The process of claim 1, comprising heating the bilayer in the furnace at about 1100° C. to about 1200° C.

3. The process of claim 1, wherein moving the stack through the furnace comprises heating the stack in the furnace at a ramp rate of up to about 100° C. per minute; or at a ramp rate of about 5° C. per minute to about 35° C. per minute.

4. The process of claim 1, wherein the bilayer moves through the furnace at a rate of between about 20 mm/min to about 80 mm/min.

5. The process of claim 1, wherein the bilayer dwells in the furnace for about 1 minute to about 10 minutes.

6. The process of claim 1, further comprising a binder burn-out step prior to sintering the bilayer, wherein the binder burn-out step comprises heating the stack to evaporate organic material from the stack.

7. The process of claim 6, wherein the binder burn-out step occurs for about 5 seconds to about 5 minutes.

8. The process of claim 6, wherein the bilayer, prior to the binder burn-out step, comprises at least one member selected from a solvent, a binder, a dispersant, a plasticizer, a surfactant, or a combination thereof.

9. The process of claim 1, wherein the lithium-stuffed garnet layer is characterized by the formula $Li_A La_B Zr_C O_F$, $Li_A La_B M'_C M''_D Ta_E O_F$, or $Li_A La_B M'_C M''_D Nb_E O_F$, wherein $4<A<8.5$, $1.5<B<4$, $0 \leq C \leq 2$, $0 \leq D \leq 2$; $0 \leq E \leq 2.5$, $10<F<13$, and M' and M" are each, independently in each instance selected from Al, Mo, W, Nb, Ga, Sb, Ca, Ba, Sr, Ce, Hf, Rb, and Ta; or $Li_A La_B Zr_C Al_d Me''_e O_f$, wherein $5<a<7.7$; $2<b<4$; $0 \leq c \leq 2.5$; $0 \leq d \leq 2$; $0 \leq e \leq 2$, $10<f<13$ and Me" is a metal selected from Nb, V, W, Mo, Ta, Ga, and Sb.

10. The process of claim 1, wherein the metal layer comprises a metal selected from the group consisting of nickel, tungsten, copper, iron, titanium, molybdenum, alloys thereof, and combinations thereof.

11. The process of claim 1, wherein the sintered bilayer has a thickness of about 20 µm to about 40 µm.

12. The process of claim 1, wherein the sintered bilayer has a width of between about 50 mm to about 150 mm.

13. The process of claim 1, wherein the furnace comprises an atmospheric controller that maintains an atmosphere in the furnace that comprises argon (Ar) gas, nitrogen ($N_2$) gas, hydrogen gas, forming gas, or a mixture thereof; and wherein the atmospheric controller maintains the atmosphere in the furnace comprises less than 500 ppm $O_2$; or wherein the atmospheric controller maintains an atmosphere in the furnace comprises less than 250 ppm $O_2$.

14. The process of claim 1, wherein the first plate comprises a material selected from the group consisting of alumina ($Al_2O_3$), zirconium toughened alumina (ZTA), mullite ($3Al_2O_3 \cdot 2SiO_2$ or $2Al_2O_3 \cdot SiO_2$), aluminum nitride (AlN), and silicon carbide (SiC).

15. The process of claim 1, wherein the second plate comprises a material selected from the group consisting of alumina ($Al_2O_3$), zirconium toughened alumina (ZTA), mullite ($3Al_2O_3 \cdot 2SiO_2$ or $2Al_2O_3 \cdot SiO_2$), aluminum nitride (AlN), or and silicon carbide (SiC).

16. The process of claim 1, wherein the frame comprises a material selected from the group consisting of porous alumina, zirconia, lithium aluminate, lithium tantalate, alumina, silica, cordierite, Ni, kovar, and invar.

17. The process of claim 1, wherein the second plate is a center-less cover.

18. The method of claim 1, wherein moving the stack through the furnace comprises moving the stack on a conveyor through the furnace, wherein the conveyor comprises a plurality of rollers, wherein the rollers contact the first plate of the stack.

19. The method of claim 1, wherein the green body layer comprises lithium-stuffed garnet, precursors to lithium-stuffed garnet, or a combination thereof.

20. A sintered bilayer prepared by the process of claim 1.

* * * * *